US009820530B2

(12) United States Patent
Cross et al.

(10) Patent No.: US 9,820,530 B2
(45) Date of Patent: Nov. 21, 2017

(54) KNIT ARTICLE OF FOOTWEAR WITH CUSTOMIZED MIDSOLE AND CUSTOMIZED CLEAT ARRANGEMENT

(71) Applicant: NIKE, Inc., Beaverton, OR (US)

(72) Inventors: Tory M. Cross, Portland, OR (US); Daniel A. Podhajny, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 377 days.

(21) Appl. No.: 14/598,447

(22) Filed: Jan. 16, 2015

(65) Prior Publication Data

US 2016/0206042 A1 Jul. 21, 2016

(51) Int. Cl.
| | |
|---|---|
| A43B 1/04 | (2006.01) |
| A43B 13/12 | (2006.01) |
| A43B 23/04 | (2006.01) |
| G06Q 30/06 | (2012.01) |
| A43B 13/22 | (2006.01) |
| A43B 1/00 | (2006.01) |

(52) U.S. Cl.
CPC .......... *A43B 13/122* (2013.01); *A43B 1/0027* (2013.01); *A43B 1/04* (2013.01); *A43B 13/12* (2013.01); *A43B 13/22* (2013.01); *A43B 13/223* (2013.01); *A43B 23/042* (2013.01); *G06Q 30/0621* (2013.01); *G06Q 30/0633* (2013.01); *G06Q 30/0643* (2013.01); *A43D 2200/60* (2013.01)

(58) Field of Classification Search
CPC .... A43B 1/04; A43B 3/10; A43B 5/00; A43B 13/02; A43B 13/12; A43B 13/22
USPC .............................. 36/25 R, 59 R, 59 C, 9 R
See application file for complete search history.

(56) References Cited

U.S. PATENT DOCUMENTS

| | | | |
|---|---|---|---|
| 1,852,883 | A | 4/1932 | Gustaveson |
| 3,087,262 | A | 4/1963 | Russell |
| 3,352,032 | A | 11/1967 | Yamaguchi |
| 3,834,046 | A | 9/1974 | Fowler |
| 4,149,274 | A | 4/1979 | Garrou et al. |
| 4,187,620 | A | 2/1980 | Selner |
| 4,348,003 | A | 9/1982 | Beneteau |

(Continued)

FOREIGN PATENT DOCUMENTS

| | | |
|---|---|---|
| DE | 4214831 | 11/1993 |
| EP | 2 792 265 A2 | 10/2014 |

(Continued)

OTHER PUBLICATIONS

Office Action in U.S. Appl. No. 14/598,389, dated Jul. 11, 2016, 17 pages.

(Continued)

*Primary Examiner* — Marie Bays
(74) *Attorney, Agent, or Firm* — Brinks Gilson & Lione

(57) ABSTRACT

Method for producing a customized midsole and a customized cleat representation for an article of footwear comprising a knit outsole. The method includes obtaining information relating to a customized cleat arrangement in a knit outsole and other information relating to a midsole customized to the user's foot and having cleat reinforcements arranged to match the cleat arrangement on the knit outsole. The information is used to form an article of footwear including the customized knit outsole and the customized midsole.

23 Claims, 18 Drawing Sheets

(56) References Cited

U.S. PATENT DOCUMENTS

| | | | |
|---|---|---|---|
| 4,356,643 A * | 11/1982 | Kester | A43B 13/22 36/59 C |
| 4,631,221 A | 12/1986 | Disselbeck et al. | |
| 4,651,354 A | 3/1987 | Petrey | |
| 5,077,916 A | 1/1992 | Beneteau | |
| 5,086,576 A | 2/1992 | Lamson | |
| 5,330,818 A | 7/1994 | Langley | |
| 5,367,791 A | 11/1994 | Gross et al. | |
| 5,537,762 A | 7/1996 | Walters | |
| 5,595,003 A | 1/1997 | Snow | |
| 5,619,809 A | 4/1997 | Sessa | |
| 5,836,094 A | 11/1998 | Figel | |
| 5,896,680 A | 4/1999 | Kim et al. | |
| 5,926,974 A | 7/1999 | Friton | |
| 6,007,898 A | 12/1999 | Kim et al. | |
| 6,029,376 A | 2/2000 | Cass | |
| 6,145,221 A | 11/2000 | Hockerson | |
| 6,412,196 B1 | 7/2002 | Gross | |
| 6,430,844 B1 | 8/2002 | Otis | |
| 6,571,491 B2 * | 6/2003 | Safdeye | A43B 13/12 12/142 G |
| 6,598,324 B1 | 7/2003 | Tsuji | |
| 6,658,766 B2 | 12/2003 | Kraeuter et al. | |
| 6,685,011 B2 | 2/2004 | Nishiwaki et al. | |
| 6,691,432 B2 | 2/2004 | Masseron | |
| 6,698,109 B2 * | 3/2004 | Otis | A43B 3/0078 12/142 G |
| 6,701,643 B2 | 3/2004 | Geer | |
| 6,708,342 B2 | 3/2004 | Boersema | |
| 6,729,046 B2 | 5/2004 | Ellis, III | |
| 6,751,890 B1 | 6/2004 | Tsai | |
| 6,782,642 B2 | 8/2004 | Knoche et al. | |
| 6,813,847 B2 | 11/2004 | Workman | |
| 6,823,611 B2 * | 11/2004 | Otis | A43B 3/0078 12/142 G |
| 6,840,066 B2 | 1/2005 | Dickerson | |
| 6,845,572 B1 | 1/2005 | Haimerl et al. | |
| 6,931,762 B1 | 8/2005 | Dua | |
| 6,986,269 B2 | 1/2006 | Dua | |
| 7,013,581 B2 | 3/2006 | Greene et al. | |
| 7,036,246 B2 * | 5/2006 | Otis | A43B 3/0078 12/142 G |
| 7,048,881 B2 | 5/2006 | Otis et al. | |
| 7,111,415 B2 | 9/2006 | Hockerson | |
| 7,146,750 B2 | 12/2006 | Issler | |
| 7,178,267 B2 | 2/2007 | Skaja et al. | |
| 7,313,876 B2 | 1/2008 | Morgan et al. | |
| 7,322,131 B2 * | 1/2008 | Yamashita | A43B 13/223 36/30 R |
| 7,347,011 B2 | 3/2008 | Dua et al. | |
| 7,353,626 B2 * | 4/2008 | Otis | A43B 3/0078 36/11 |
| 7,444,766 B2 | 11/2008 | Mitchell | |
| 7,467,484 B2 | 12/2008 | Chang et al. | |
| 7,487,555 B2 | 2/2009 | Takeda et al. | |
| 7,540,100 B2 | 6/2009 | Pawlus et al. | |
| 7,555,847 B2 | 7/2009 | Kendall | |
| 7,587,915 B2 | 9/2009 | Kaneda | |
| 7,591,083 B2 | 9/2009 | Geer et al. | |
| 7,703,220 B2 | 4/2010 | Aveni | |
| 7,712,229 B2 | 5/2010 | Yang | |
| 7,788,827 B2 | 9/2010 | Fogg et al. | |
| 7,793,428 B2 | 9/2010 | Shenone | |
| 7,793,434 B2 | 9/2010 | Sokolowski et al. | |
| 7,797,856 B2 | 9/2010 | Andrews et al. | |
| 7,854,076 B2 * | 12/2010 | Keppler | A43B 5/02 12/142 P |
| 7,882,648 B2 | 2/2011 | Langvin | |
| 8,029,715 B2 * | 10/2011 | Fogg | A43B 3/128 12/142 RS |
| 8,197,736 B2 | 6/2012 | Frasson et al. | |
| 8,387,282 B2 | 3/2013 | Baker et al. | |
| 8,474,155 B2 | 7/2013 | McDonald et al. | |
| 8,490,229 B2 | 7/2013 | Mintz | |
| 8,505,216 B2 | 8/2013 | Sokolowski et al. | |
| 8,505,220 B2 | 8/2013 | James et al. | |
| 8,577,751 B2 | 11/2013 | Langvin | |
| 8,713,819 B2 | 5/2014 | Auger et al. | |
| 8,756,834 B1 | 6/2014 | Halberstadt et al. | |
| 8,776,397 B2 | 7/2014 | Borel et al. | |
| 8,813,390 B2 | 8/2014 | Auger et al. | |
| 8,839,532 B2 | 9/2014 | Huffa et al. | |
| 8,914,998 B2 | 12/2014 | Gheorghian | |
| 9,078,488 B1 | 7/2015 | Meir et al. | |
| 9,326,562 B2 | 5/2016 | Weidl et al. | |
| 2002/0035796 A1 | 3/2002 | Knoche et al. | |
| 2002/0116843 A1 | 8/2002 | Harrison | |
| 2002/0148140 A1 * | 10/2002 | Otis | A43B 3/0078 36/59 R |
| 2002/0148141 A1 * | 10/2002 | Otis | A43B 3/0078 36/59 R |
| 2002/0152639 A1 * | 10/2002 | Otis | A43B 3/0078 36/59 R |
| 2002/0162248 A1 * | 11/2002 | Otis | A43B 3/0078 36/59 R |
| 2003/0033207 A1 | 2/2003 | Litke et al. | |
| 2004/0028929 A1 | 2/2004 | Chang | |
| 2004/0148803 A1 | 8/2004 | Grove | |
| 2005/0071242 A1 | 3/2005 | Allen et al. | |
| 2005/0120593 A1 | 6/2005 | Mason | |
| 2005/0198868 A1 | 9/2005 | Scholz | |
| 2005/0241182 A1 * | 11/2005 | Otis | A43B 3/0078 36/9 R |
| 2006/0059716 A1 * | 3/2006 | Yamashita | A43B 13/223 36/59 R |
| 2006/0143946 A1 * | 7/2006 | Otis | A43B 3/0078 36/9 R |
| 2008/0110048 A1 | 5/2008 | Dua et al. | |
| 2008/0263900 A1 | 10/2008 | Determe | |
| 2009/0090024 A1 | 4/2009 | Phlawadana | |
| 2009/0181590 A1 | 7/2009 | Hansen et al. | |
| 2009/0183389 A1 | 7/2009 | Miller et al. | |
| 2009/0320326 A1 * | 12/2009 | Keppler | A43B 5/02 36/114 |
| 2010/0112275 A1 | 5/2010 | Hansen et al. | |
| 2010/0146823 A1 | 6/2010 | Yabushita | |
| 2010/0154256 A1 | 6/2010 | Dua | |
| 2010/0186265 A1 | 7/2010 | Evans | |
| 2010/0235258 A1 | 9/2010 | Langvin | |
| 2011/0047816 A1 | 3/2011 | Nurse | |
| 2011/0047833 A1 | 3/2011 | Tai | |
| 2011/0167677 A1 | 7/2011 | Peikert et al. | |
| 2011/0302807 A1 | 12/2011 | McDuff | |
| 2012/0180343 A1 | 7/2012 | Auger et al. | |
| 2012/0233882 A1 | 9/2012 | Huffa et al. | |
| 2012/0234052 A1 | 9/2012 | Huffa et al. | |
| 2012/0317841 A1 | 12/2012 | Taylor et al. | |
| 2013/0019499 A1 | 1/2013 | Hsu | |
| 2013/0091741 A1 | 4/2013 | Frank | |
| 2013/0174445 A1 | 7/2013 | Hakkala et al. | |
| 2013/0232823 A1 | 9/2013 | Kasprzak | |
| 2013/0269212 A1 | 10/2013 | Little | |
| 2013/0276333 A1 | 10/2013 | Wawrousek et al. | |
| 2013/0318831 A1 | 12/2013 | Foxen | |
| 2013/0326911 A1 | 12/2013 | Baucom et al. | |
| 2013/0340289 A1 | 12/2013 | Thevenoud | |
| 2013/0340290 A1 | 12/2013 | Hartmann | |
| 2013/0340295 A1 | 12/2013 | Adami et al. | |
| 2014/0020192 A1 | 1/2014 | Jones et al. | |
| 2014/0068968 A1 | 3/2014 | Podhajny et al. | |
| 2014/0082964 A1 | 3/2014 | Lin | |
| 2014/0123520 A1 | 5/2014 | Tayar | |
| 2014/0150297 A1 | 6/2014 | Holmes et al. | |
| 2014/0202039 A1 | 7/2014 | Geer et al. | |
| 2014/0245632 A1 | 9/2014 | Podhajny | |
| 2014/0245633 A1 | 9/2014 | Podhajny | |
| 2014/0290099 A1 | 10/2014 | Corbett | |
| 2014/0310983 A1 | 10/2014 | Tamm et al. | |
| 2014/0310984 A1 | 10/2014 | Tamm | |
| 2014/0310985 A1 | 10/2014 | Tran et al. | |
| 2014/0310986 A1 | 10/2014 | Tamm | |
| 2014/0345164 A1 | 11/2014 | Campbell et al. | |

(56) References Cited

U.S. PATENT DOCUMENTS

| | | |
|---|---|---|
| 2014/0352179 A1 | 12/2014 | Bell |
| 2014/0366402 A1 | 12/2014 | Cavaliere |
| 2014/0373392 A1 | 12/2014 | Cullen |
| 2015/0013187 A1 | 1/2015 | Taniguchi et al. |
| 2015/0040436 A1 | 2/2015 | Clerc et al. |
| 2015/0040438 A1 | 2/2015 | Baucom |
| 2015/0052778 A1 | 2/2015 | Kirk |
| 2015/0068064 A1 | 3/2015 | Morag et al. |
| 2015/0113831 A1 | 4/2015 | Weingart et al. |
| 2015/0128449 A1 | 5/2015 | Lin |
| 2015/0201707 A1 | 7/2015 | Bruce |
| 2015/0223552 A1 | 8/2015 | Love et al. |
| 2015/0245684 A2 | 9/2015 | Heard et al. |
| 2015/0250256 A1 | 9/2015 | Podhajny |
| 2015/0257484 A1 | 9/2015 | Campbell et al. |
| 2015/0273778 A1 | 10/2015 | Campos, II |
| 2015/0320139 A1 | 11/2015 | Peitzker |
| 2015/0351493 A1 | 12/2015 | Ashcroft |
| 2016/0000173 A1 | 1/2016 | Spielmann et al. |
| 2016/0031164 A1 | 2/2016 | Downs |
| 2016/0066651 A1 | 3/2016 | Terai |
| 2016/0073727 A1 | 3/2016 | Bier et al. |
| 2016/0073728 A1 | 3/2016 | Peikert et al. |
| 2016/0081419 A1 | 3/2016 | Theoklitos |
| 2016/0095377 A1 | 4/2016 | Tamm |
| 2016/0114546 A1 | 4/2016 | Yang |

FOREIGN PATENT DOCUMENTS

| | | |
|---|---|---|
| GB | 2063054 | 6/1981 |
| GB | 2092881 | 8/1982 |
| JP | H06284905 | 10/1994 |
| JP | 2013231261 | 11/2013 |
| WO | 9943229 | 9/1999 |
| WO | WO 2009/149886 A1 | 12/2009 |

OTHER PUBLICATIONS

Office Action in U.S. Appl. No. 14/598,406, dated Jul. 12, 2016, 14 pages.
Office Action in U.S. Appl. No. 14/598,433, dated Aug. 4, 2016, 10 pages.
International Search Report and Written Opinion for International Application No. PCT/US2016/013078, dated Mar. 24, 2016.
http://www.footyheadlines.com/2014/03/adidas-primeknit-fs-football-boot.html.
http://solecollector.com/news/adidas-soccer-unveils-primeknit-fs-world-s-first-knitted-cleat-sock-hybrid/.
http://solecollector.com/news/adidas-unveils-samba-primeknit-first-knitted-soccer-cleat/.
International Search Report and Written Opinion for International Application No. PCT/US2016/013076, dated May 18, 2016, 14 pages.
Office Action in corresponding U.S. Appl. No. 14/598,389, dated Mar. 1, 2017, 14 pages.
Office Action in corresponding U.S. Appl. No. 14/598,433, dated Apr. 19, 2017, 17 pages.
Office Action in corresponding U.S. Appl. No. 14/598,406, dated Feb. 22, 2017, 14 pages.

\* cited by examiner

KNIT ARTICLE OF FOOTWEAR WITH CUSTOMIZED MIDSOLE AND CUSTOMIZED CLEAT ARRANGEMENT

BACKGROUND

The present invention relates generally to a method of manufacturing footwear, and in particular to a method for manufacturing an article of footwear having a knit outsole with customized cleat placement and with a customized midsole.

Designs discussing interchangeable cleats, including adjustable cleat patterns, have been previously discussed. Workman (U.S. Pat. No. 6,813,847) teaches a boot with a replaceable sole plate. The boot has a cavity located in the bottom of the sole and a sole plate that releasably fits within this cavity. Workman teaches a sole plate that can easily and quickly be replaced with other sole plates having different types of traction surfaces.

Although Workman teaches a boot with a replaceable sole plate, Workman fails to teach a system and/or method where a customer can design a customized cleat configuration. Instead, Workman only teaches a system where a customer can swap one preconfigured clear design along the bottom of a sole plate with another preconfigured design.

Tsuji (U.S. Pat. No. 6,598,324) teaches a bowling shoe having customizable ground engagement. Tsuji discloses a bowling shoe construction that has various options for removing and replacing slide parts to attach to the tread surface of a slide shoe. Tsuji teaches the use of annular cleats with a slide shoe. Although Tsuji discloses various arrangements of the annular cleats that may be used with the slide pad, the holes corresponding to the annular cleats are preconfigured, and are not customizable by the user or customer. Furthermore, Tsuji teaches the use of annular cleats for bowling shoes that are intended to be used on smooth wooden surfaces, not the use of cleats intended to penetrate into both natural and synthetic turf.

Designs discussing customization of shoe fit also have been discussed. Some customizing designs relate to pads or insoles added to the inside of the shoe upper and do not relate to midsoles. Further, there is no interaction between such insole modifications and a knit outsole or a cleat system for an article of footwear including a knit outsole.

There is a need in the art for a customizable cleat system for an article of footwear including a knit outsole and a customizable midsole that solves the problems of the prior art.

SUMMARY

Aspects of the disclosure relate to a method for producing a customized midsole and a customized cleat arrangement for an article of footwear comprising a knit outsole. The method includes obtaining information relating to a customized cleat arrangement in a knit outsole and other information relating to a midsole customized to the user's foot and having cleat reinforcements arranged to match the cleat arrangement on the knit outsole. The information is used to form an article of footwear including the customized knit outsole and the customized midsole.

In particular, aspects of the disclosure provide a method for producing a customized midsole and a customized cleat arrangement for an article of footwear comprising a knit outsole. The method includes providing a cleat graphical interface system, a set of cleat graphics tools associated with the cleat graphical interface system, and a group of pre-designed cleat arrangements. Each pre-designed cleat arrangement in the group of pre-designed cleat arrangements includes a knit outsole representation having pre-defined cleat locations and a pre-defined number of cleats.

The method also includes providing a midsole graphical interface system, a set of midsole graphics tools associated with the midsole graphical interface system, and a group of pre-designed midsoles. Each pre-designed midsole in the group of pre-designed midsoles includes reinforcement members projecting from the bottom of the midsole.

Information related to a customized cleat arrangement including at least a knit outsole representation associated with a selected one pre-designed cleat arrangement from the group of pre-designed cleat arrangements that has been modified to change at least one of the pre-defined cleat locations and the pre-defined number of cleats is received from the cleat graphical interface system. Similarly, information related to a customized midsole including at least one representation of the impression of the user's foot or of the reinforcement members associated with a selected one pre-designed midsole arrangement from the group of pre-designed midsole arrangements that has been modified to change at least one of the pre-defined reinforcement locations and the representation of the impression of the user's foot is received from the midsole graphical interface system.

An article of footwear with the customized midsole and the customized cleat arrangement including the at least one knit outsole representation having at least one changed pre-defined cleat location and changed pre-defined number of cleats and including a customized midsole including at least one changed pre-defined location or changed pre-defined number of cleats and a modified midsole representation having at least one changed representation of the impression of the user's foot or reinforcing member is produced.

In another aspect, the disclosure provides a method for customizing an article of footwear comprising a sole system including a knit outsole and a midsole. The knit outsole has a ground-engaging side that includes a location for a ground-engaging cleat member and a top side. The midsole has a top side customized to the user's foot and a bottom side having a rigid protrusion, the location and size of which is customized to the user. The method includes permanently installing the bottom side of the midsole in contact with the top side of the outsole, with the rigid protrusion on the bottom of the midsole in registration with the location for the ground-engaging cleat member, and pressing the bottom side of the midsole into the knit outsole to stretch the knit outsole in the location for the ground-engaging cleat member to permanently install the midsole and to form the ground-engaging cleat member.

In still another aspect, the disclosure provides another method for customizing an article of footwear comprising a sole system including a knit outsole and a midsole. The knit outsole has a top side and a ground-engaging side that has a knit member extending away from the ground-engaging side. The midsole has a top side customized to the user's foot and a bottom side having a rigid protrusion, the location and size of which is customized to the user and located in registration with the knit member on the ground-engaging side. The method includes permanently installing the bottom side of the midsole in contact with the top side of the outsole with the rigid protrusion on the bottom of the midsole in registration with the ground-engaging cleat member. The bottom side of the midsole is pressed into the knit outsole to permanently install the midsole and to form the ground-engaging cleat member.

In yet other aspects, the disclosure provides a method for customizing an article of footwear comprising a one-piece knitted component that encloses the foot and includes a sole system including a knit outsole and a midsole. The knit outsole had a ground-engaging side including a location for a ground-engaging cleat member and a top side. The top side of the midsole is customized to the user and the bottom side has a rigid protrusion. The location and size of the rigid protrusion is customized to the user's foot. The bottom side of the midsole is in contact with the top side of the outsole with the rigid protrusion on the bottom of the midsole in registration with the location for the ground-engaging cleat member. The bottom side of the midsole is pressed into the knit outsole to stretch the knit outsole in the location for the ground-engaging cleat member to permanently install the midsole and to form the ground-engaging cleat member.

In still another aspect, the disclosure provides a method for ordering a customized midsole and a customized cleat arrangement for an article of footwear comprising a knit outsole. A user interacts with a cleat graphical interface system and selects a first pre-designed cleat arrangement from a group of pre-designed cleat arrangements that include a representation of a knit outsole having pre-defined cleat locations and a pre-defined number of cleats. The user then selects a cleat graphics tool and interacts with the cleat graphical interface system by modifying the representation of the knit outsole displayed within the cleat graphical interface system to alter at least one of the pre-defined cleat locations or the pre-defined number of cleats to create a customized cleat arrangement. The customized cleat arrangement including at least one changed pre-defined cleat location or changed pre-defined number of cleats within the cleat graphical interface system.

Information relating to the user's foot is obtained, and a first pre-designed midsole is selected from a group of pre-designed midsoles that include pre-defined locations for cleat reinforcing members in registration with cleats in the customized cleat arrangement by interacting with a midsole graphical interface system. The representation of the midsole displayed within the midsole graphical interface system is modified using the selected midsole graphics tool to alter the first-designed midsole such that at least one of the representation of the impression of the user's foot or the reinforcing members is changed to create a customized midsole arrangement. The customized midsole arrangement including at least one changed representation of the impression of the user's foot or reinforcing member within the midsole graphical interface system is displayed. Then, a finalized design including a modified knit outsole representation having the customized cleat arrangement including at least one changed pre-defined location or changed pre-defined number of cleats and a modified midsole representation having at least one changed representation of the impression of the user's foot or reinforcing member, is submitted to order the shoe.

In another aspect, the invention provides a method for ordering a customized cleat arrangement for an article of footwear having a knit outsole, comprising the steps of: interacting with a graphical interface system; modifying an knit outsole representation; selecting a graphics tool from a set of graphics tools; using the graphics tool to create a customized cleat arrangement; and submitting a finalized design including an knit outsole representation with a customized cleat arrangement, and ordering the article of footwear having a knit outsole.

Other systems, methods, features and advantages of the invention will be, or will become apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
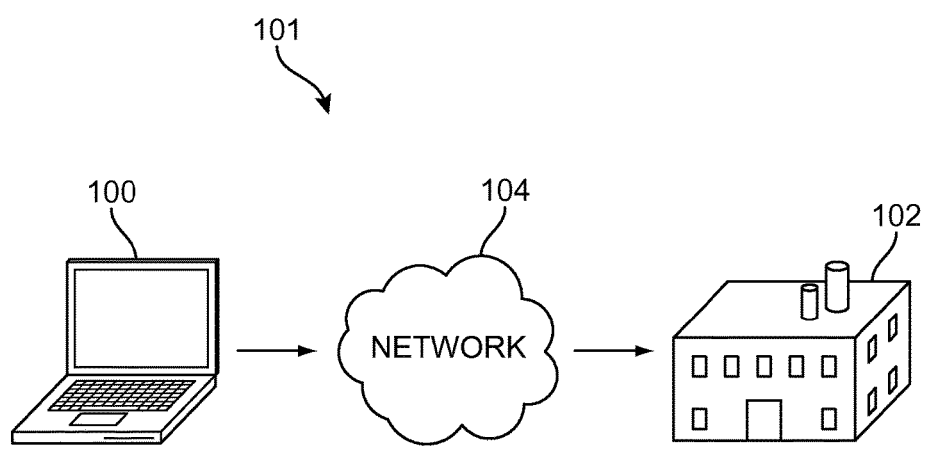
FIG. 1 is an embodiment of a midsole and cleat customization system.

FIG. 1 is a schematic diagram of an illustrative embodiment of midsole and cleat customization system 101. The term customization system, as used throughout this detailed description, refers to a system for manufacturing articles of footwear having a knit outsole through the production of easily customizable portions of an article of footwear having a knit outsole. In some embodiments, these portions may be customized by the manufacturer or a third party designer. In an embodiment, the portions may be customized by the party purchasing the articles of footwear having a knit outsole.

Furthermore, it should be understood that the following midsole and cleat customization system 101 may be used to manufacture customized cleat arrangements for any type of footwear having a knit outsole. Examples include, but are not limited to, football shoes, soccer shoes, baseball shoes, hiking boots, as well as other types of footwear having a knit outsole. Generally, any type of footwear having a knit outsole including cleats may be manufactured using midsole and cleat customization system 101.

In an embodiment, midsole and cleat customization system 101 comprises a remote terminal 100 connected to factory 102 by way of network 104. Generally, remote terminal 100 may be any type of computer, including either a desktop or a laptop computer. In other embodiments, remote terminal 100 may be any type of device that includes a display, a processor, and the ability to transmit and receive data from a remote network. Examples of such devices include, but are not limited to, PDA's, cell phones, as well as other types of devices.

In this embodiment, factory 102 represents a manufacturing system configured to manufacture articles of footwear having a knit outsole. Here, factory 102 is shown as a single building for illustrative purposes only. In many cases, factory 102 will comprise many buildings. In some cases, factory 102 may comprise many buildings that are disposed in different geographic locations. Generally, the term factory, as used here, may also refer to distributors and/or suppliers. In other words, the term factory may also apply to various operations on the manufacturing side, including the operations responsible for parts, labor, and/or retail of the article of footwear having a knit outsole, as well as other manufacturing side operations.

Network 104 may be configured to relay information between computer 100 and factory 102. Generally, network 104 may be a system allowing for the exchange of information between remote terminal 100 and factory 102. Examples of such networks include, but are not limited to, personal area networks, local area networks, wide area networks, client-server networks, peer-to-peer networks, as well as other types of networks. Additionally, the network may support wired transmissions, wireless transmissions, or both wired and wireless transmissions. In some embodiments, network 104 may be a packet-switched communications system. In an embodiment, network 104 may be the Internet.

Although some embodiments include provisions for transferring information between a customer and the manufacturer using the Internet, in other embodiments, information may be transferred between the customer and the manufacturer using other provisions. In some cases, for example, information may be exchanged via mail, fax, courier, as well as other forms of communication.

Midsole and cleat customization system 101 may include provisions that allow a customer to design a portion of an article of footwear having a knit outsole that will be produced by a manufacturer. In some embodiments, midsole and cleat customization system 101 includes provisions that allow a customer to design a customized cleat arrangement for an article of footwear having a knit outsole. In an embodiment, a customer may use midsole and cleat customization system 101 to select the arrangement of cleats, as well as the size and type of cleats used with an article of footwear having a knit outsole. In some embodiments, a customer may use midsole and cleat customization system 101 to customize a midsole used in an article of footwear having a knit outsole.

Figure 2:
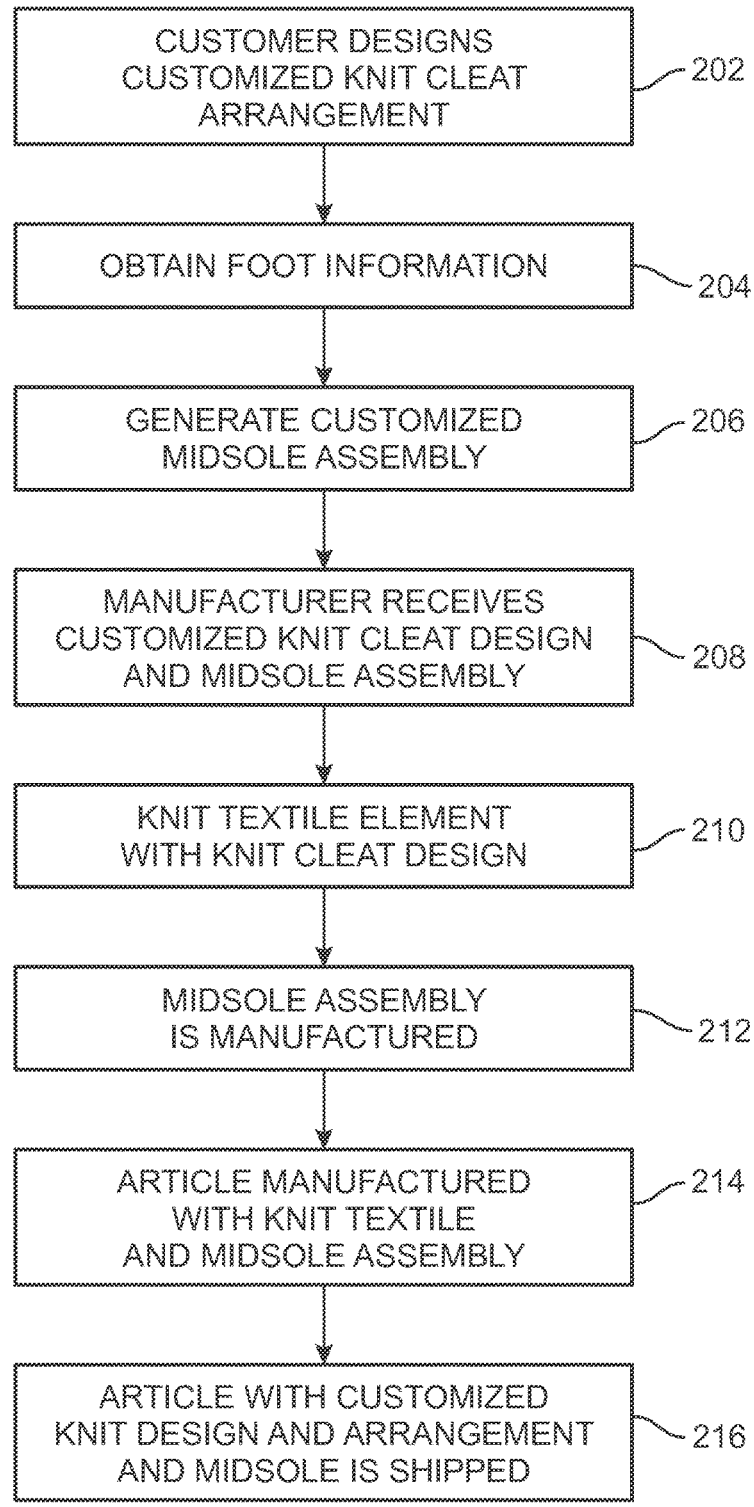
FIG. 2 is an embodiment of a process for a midsole and cleat customization system.

FIG. 2 is an embodiment of a method for designing a customized midsole and a customized cleat arrangement using midsole and cleat customization system 101. During first step 202, a customer may interact with a website in order to design a customized cleat arrangement. In some cases, the customer may select a pre-designed customized cleat arrangement. During second step 204, information relating to the user's foot is obtained. Foot information may be obtained by any suitable method, including but not limited to physical measurements or impressions on deformable surfaces, computer-related scanning, or 3-D imaging. The foot information is used, together with the custom knit cleat arrangement of step 202, to generate a custom midsole assembly in step 206. The custom midsole assembly includes a top side having a custom foot-contacting surface and a bottom side having a rigid protrusion matching or registering with a cleat as arranged in step 202.

Once the customer has finalized the customized cleat arrangement and the customized midsole, the manufacturer may receive the customer's design, as in fourth step 208. Following this, the article of footwear having a knit outsole, including the customized cleat arrangement, may be manufactured (knitted) according to the customer's design during fifth step 210. After the knit outsole with the customized cleat arrangement is completed, the midsole assembly is manufactured in step 212. The customized midsole has a projection from the bottom side to register with and reinforce a cleat in the knit outsole. The midsole is inserted into the article of footwear and urged into place as part of step 214, wherein the rigid protrusion is inserted into or registered with a corresponding cleat member. Then, during step 216, the article of footwear having a knit outsole, including a customized cleat arrangement, may be shipped to a pre-designated address that may belong to the customer, a retail store or another party.

Figure 3:
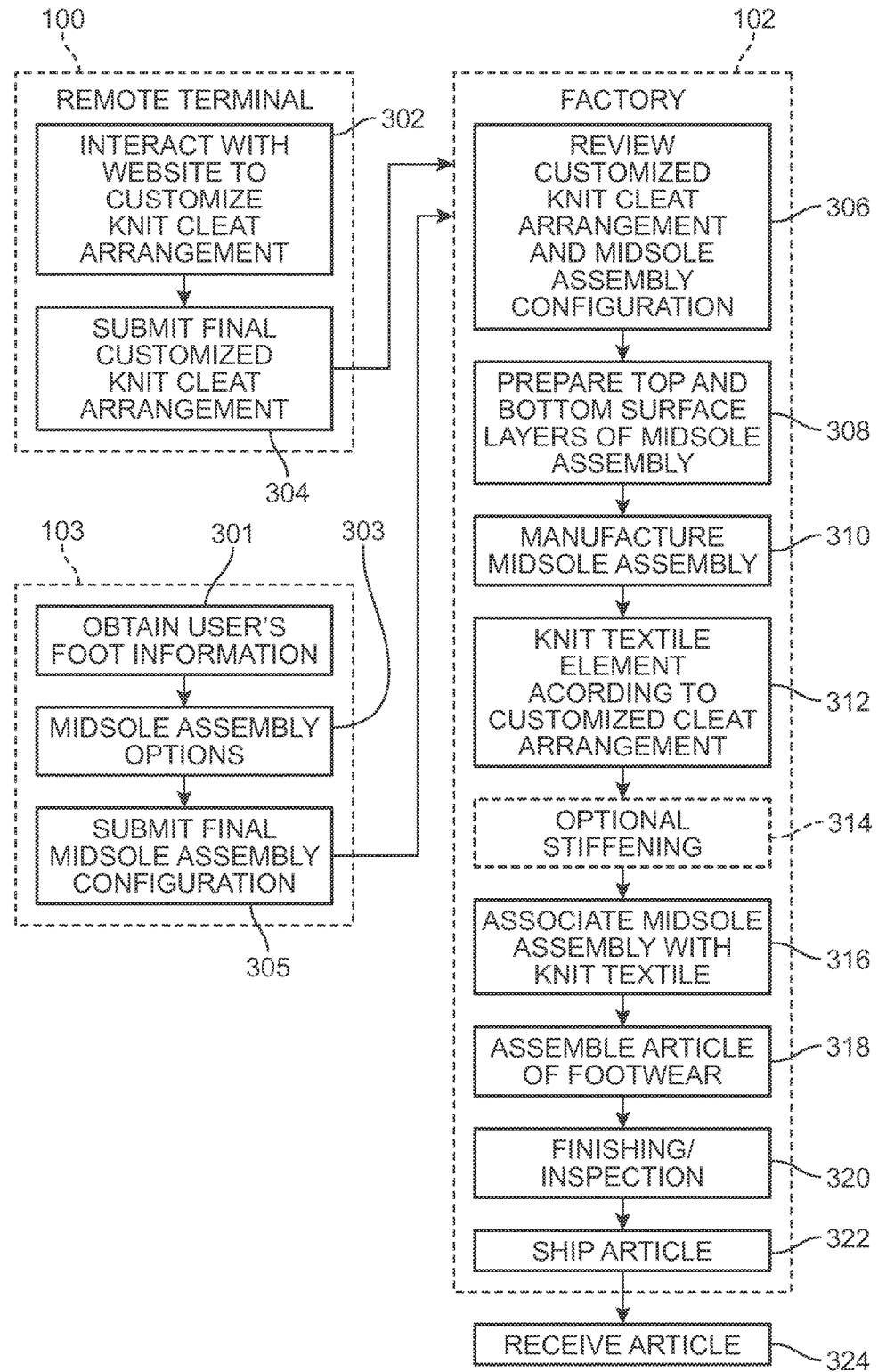
FIG. 3 is an embodiment of a detailed process for a midsole and cleat customization system.

Referring to FIG. 3, midsole and cleat customization system 101 may be best understood by separating the steps associated with remote terminal 100 and foot information system 103 on the one hand and those associated with factory 102 on the other hand. In some embodiments, those steps associated with remote terminal 100 are performed on or by remote terminal 100, those steps associated with foot information are performed in foot information step 103, and those steps associated with factory 102 are performed on or by factory 102. However, this is not necessarily the case, and some of the steps associated with remote terminal 100 and foot information system 103 may be performed on or by factory 102 or some other resource, and some of the steps associated with factory 102 may be performed on or by remote terminal 100, foot information system 103, or some other resource.

In first step 302, a customer may access a remote website with remote terminal 100. In some embodiments, the customer may use the website to design an article of footwear having a knit outsole with a customized cleat arrangement during this step. Here, the term website is used in the most general sense as meaning any collection of data located on a remote server accessible with a web browser of some kind. In many cases, a website may be a collection of web pages found on the World Wide Web. In an embodiment, the term web page may refer to any HTML/XHTML document.

In some embodiments, factory 102 includes a server of some type that supports a website with a graphical interface system. This graphical interface system may be used to design an article of footwear having a knit outsole with a customized cleat arrangement. In some embodiments, the graphical interface system may be a graphical editor of some kind. In an embodiment, the graphical interface system may provide a set of tools that allow the customer to easily design a customized cleat arrangement for an article of footwear.

In an alternative embodiment, a website supporting a graphical interface system may be hosted outside of factory 102. In other words, the website may be owned and run by a third party separate from the manufacturer of the customizable articles of footwear having a knit outsole. Generally, the process of customizing an article of footwear having a knit outsole may proceed as before. In this case, the finalized design information will be processed and sent to the manufacturer by the third party.

Once the customer has finished designing the article of footwear having a knit outsole, the finalized design may be submitted to factory 102 during second step 304. In some embodiments, the submission may be transferred through the Internet. In other embodiments, the submission may occur by way of mail, fax, or other forms of communication.

Information about the user's foot is obtained from foot information system 103. In step 301, a customer may make foot information available in a number of ways in step 301. The user's foot may be physically measured. In some embodiments, foot information may be obtained in digital form, such as by a computer scan. In other embodiments, foot information may be obtained by any 3-D imaging. Such systems are described in more detail below, particularly in relationship with FIG. 9.

In first step 302, a customer may access a remote website with remote terminal 100. In some embodiments, the customer may use the website to design an article of footwear having a knit outsole with a customized cleat arrangement during this step. Here, the term website is used in the most general sense as meaning any collection of data located on a remote server accessible with a web browser of some kind. In many cases, a website may be a collection of web pages found on the World Wide Web. In an embodiment, the term web page may refer to any HTML/XHTML document.

In some embodiments, factory 102 includes a server of some type that supports a website with a graphical interface system. This graphical interface system may be used to design an article of footwear having a knit outsole with a customized cleat arrangement. In some embodiments, the graphical interface system may be a graphical editor of some kind. In an embodiment, the graphical interface system may provide a set of tools that allow the customer to easily design a customized cleat arrangement for an article of footwear.

In an alternative embodiment, a website supporting a graphical interface system may be hosted outside of factory 102. In other words, the website may be owned and run by a third party separate from the manufacturer of the customizable articles of footwear having a knit outsole. Generally, the process of customizing an article of footwear having a knit outsole may proceed as before. In this case, the finalized design information will be processed and sent to the manufacturer by the third party.

Once the customer has finished designing the article of footwear having a knit outsole, the finalized design may be submitted to factory 102 during second step 304. In some embodiments, the submission may be transferred through the Internet. In other embodiments, the submission may occur by way of mail, fax or other forms of communication. Following this submission, factory 102 may receive and review the customized design during third step 306.

The user then considers midsole assembly options in step 303. In some embodiments, such options include the compositions of matter comprising the footbed, and comprising the protrusion, for example. The location of any protrusions will be related to the location of any cleats in the customized cleat arrangement selected in step 302.

In some embodiments, factory 102 includes a server of some type that supports a foot information system. This foot information system may be used to design an article of footwear having a customized cleat arrangement. In an alternative embodiment, a server supporting a foot information system may be hosted outside of factory 102. In other words, the website may be owned and run by a third party separate from the manufacturer of the customizable articles of footwear having a knit outsole. Generally, the process of customizing an article of footwear having a customized midsole may proceed as before. In this case, the finalized design information will be processed and sent to the manufacturer by the third party.

Once the user's foot information has been used to design a midsole the finalized midsole assembly may be submitted to factory 102 during step 305. In some embodiments, the submission may be transferred through the Internet. In other embodiments, the submission may occur by way of mail, fax, or other forms of communication. Following this submission, factory 102 may receive and review the entire customized design during step 306. In step 306, both the customized knit cleat arrangement and the midsole assembly configuration may be reviewed for errors, such as a mismatch between cleat locations and protrusion locations from the bottom of the midsole, for example.

In step 308, a midsole layout may be prepared based on the customized design information for both top surface and the bottom surface layers of the midsole received from the customer. During step 310, the midsole may be manufactured. During step 312, a textile element may be knitted in accordance with the customized cleat arrangement designed by the user.

In optional step 314, the textile element may be stiffened. In some embodiments, portions of the textile elements are stiffened. In some embodiments, the entirety of the textile element may be set, for example, by exposure to steam. In some embodiments, the portions of the textile element may be knit from fusible yarns that, when heated, may fuse to form a hard surface. In particular, a ground-engaging portion, such as the outsole or the bottom of the article of footwear may be such a surface, to reduce damage.

When the midsole is complete and optionally treated, the midsole assembly may be associated with the knit textile, as illustrated by step 316. The midsole assembly may be associated with the knit textile by inserting the midsole into the textile element, typically by way of the opening for the ankle or by wrapping the article of footwear is wrapped around the foot to enclose it. Then, the midsole may be pushed down into registration with the outsole. The projections on the midsole then may be inserted into the cleats on the knit portion to form the assembly.

Following this, the finished article of footwear having a knit outsole may be inspected during step 320. During step 322 and step 324, the article of footwear having a knit outsole may be shipped from factory 102 to a pre-designated shipping address.

The following description discusses the details of the steps outlined and briefly described with reference to FIG. 3. In some embodiments, a customer has access to a remote terminal. Using the remote terminal, the customer may gain access to a website supplied by the manufacturer or a third party. In some embodiments, the website may include a graphical interface system, as discussed briefly in first step 302.

Although the current embodiment discloses the concept of submitting a customized cleat arrangement to a factory from a remote location, in other embodiments each step in the process of using a midsole and cleat customization system may performed at a single location, or at different locations. In one embodiment, for example, a midsole and cleat customization system could be associated with a retail store. In particular, upon arriving at a retail store, a clerk or employee of the retail store may help the customer to determine a customized cleat arrangement. In some cases, the clerk may help the customer select a customized cleat arrangement using a website. In other cases, the clerk may use other provisions for helping the customer to select a customized cleat arrangement. At this point, one or more employees of the retail store can perform the steps of making the article with a customized cleat arrangement using one or more machines that may be located at the retail location. In other embodiments, the steps of making the article with customized cleat placement may be performed at a location different than a retail store or a factory. For example, these steps may be performed at an intermediate facility, like a distributor, or at a different facility, like a customization facility.

Figure 9:
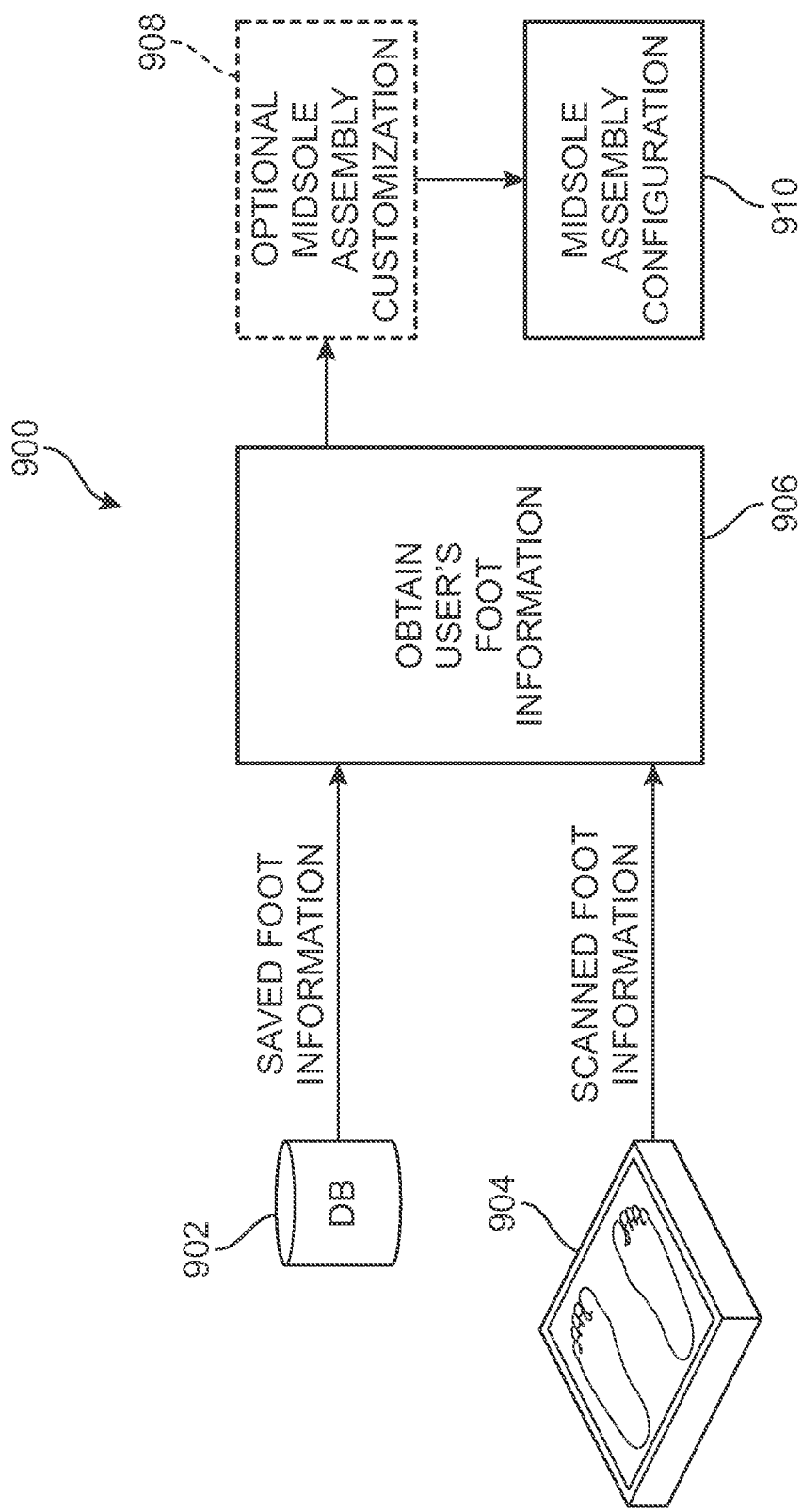
FIG. 9 is an embodiment of steps for customizing a midsole.

Embodiments of the disclosure contemplate obtaining user's foot information from the user, for example, by scanning the foot, or from a database, as illustrated in FIG. 9. Thus, steps of customization may occur in different places, such as in a retail store, or in a computer database. With this arrangement, a customer can leave the store with a pair of footwear having a knit outsole including a customized cleat arrangement without having to wait for the footwear to ship. For example, a retail store may be provided with a knitting machine to knit the customized textile and a 3-D printer for manufacturing the customized midsole.

Referring to FIGS. 4-8, graphical interface system 400 may be used to design a customized cleat arrangement. Upon accessing graphical interface system 400, a user may be initially prompted to select a size for an article of footwear having a knit outsole. In the current embodiment, seen in FIG. 4, four footwear sizes are shown, including first footwear size 401, second footwear size 402, third footwear size 403, and fourth footwear size 404. Each of these footwear sizes 401-404 may be associated with a particular shoe size. For example, first footwear size could be a size 7, second footwear size 402 could be a size 8, third footwear size 403 could be a size 9, and fourth footwear size 404 could be a size 10, each of these sizes referring to men's sizes. Only four footwear sizes are shown here for the purposes of illustration; however in other embodiments any number of sizes of footwear having a knit outsole could be shown. Additionally, graphical interface system 400 may not include visual diagrams for each footwear size, but may instead include a drop-down list for selecting the desired footwear size. In some cases, a customer may be allowed to select a first size for the left foot and a second (possibly different) size for the right foot.

Figure 4:
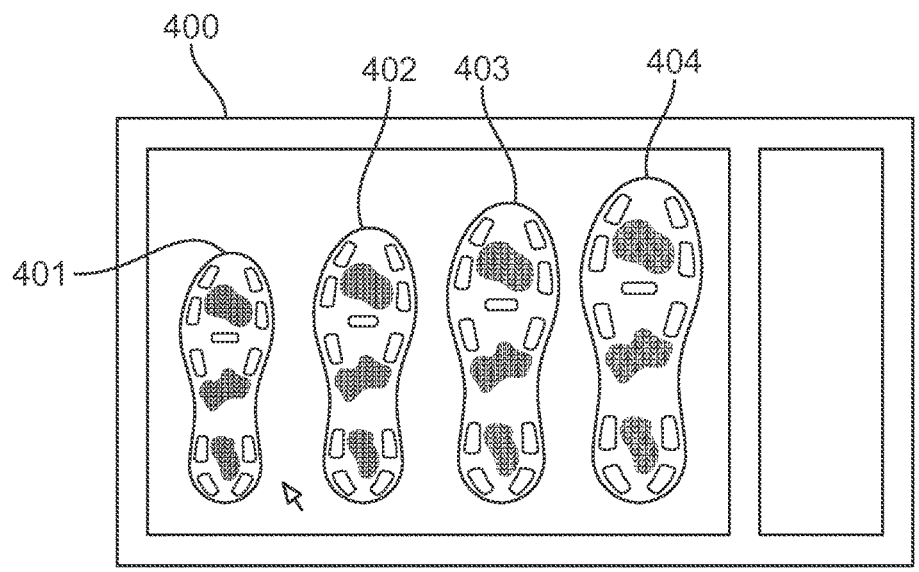
FIG. 4 is an embodiment of a graphical interface system displaying multiple sized knit outsoles.

In some embodiments, graphical interface system 400 may include pointer 406, used for making selections using graphical interface system 400. For example, using pointer 406, a user could select second footwear size 402, as shown in FIG. 4.

Once the footwear size has been selected, graphical interface system 400 may display knit outsole representation 502. The knit outsole of the current footwear design is the bottom most layer of the midsole/outsole structure of the article of footwear having a knit outsole that will receive cleats. The details associated with this knit outsole will be discussed later in this detailed description. The term knit outsole representation 502, as used throughout this specification and in the claims, refers to a two-dimensional embodiment of a knit outsole within graphical interface system 400. Specifically, the term knit outsole representation in the discussion of these embodiments includes the structural design of the represented knit outsole. Additionally, the term knit outsole representation in the discussion of these embodiments also includes any other design attributes including, but not limited to, patterns, shapes, designs, colors, images, and any other graphical feature of the outer surface of the represented knit outsole.

For the purposes of illustration, knit outsole representation 502 is depicted here in the form of a plain knit outsole. However, in other embodiments, such as those represented in FIG. 8, knit outsole representation 502 may include various graphical designs and colors. In some embodiments, knit outsole representation 502 may have a different shape, including various additional structural features.

Figure 5:
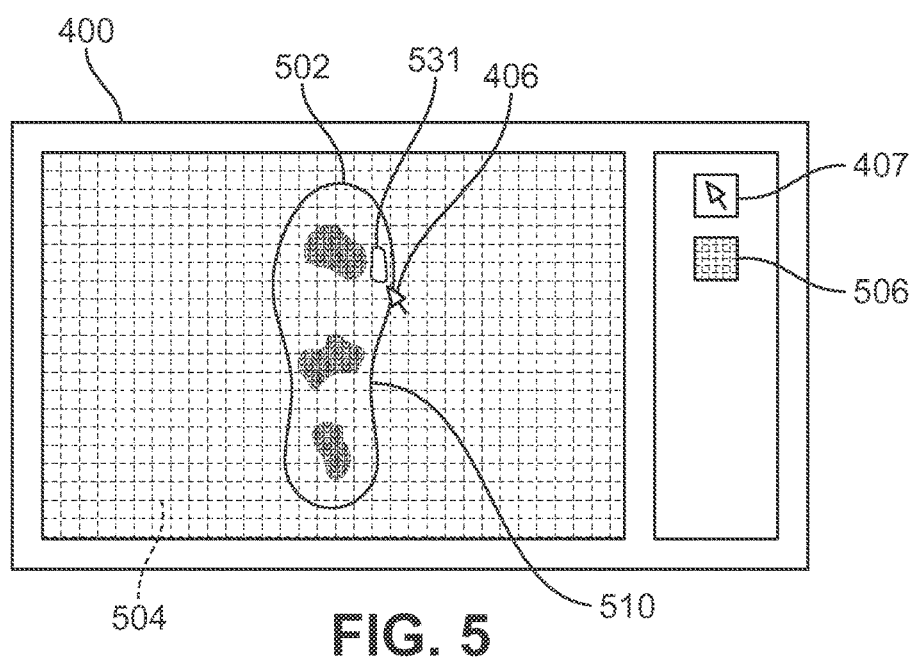
FIG. 5 is an embodiment of a graphical interface system displaying a knit outsole representation.

In some embodiments, graphical interface system 400 includes provisions for designing a customized cleat arrangement. In some embodiments, a user may manually select the location of one or more cleats on knit outsole representation 502 using pointer 406 once pointer tool 407 has been selected, as shown in FIG. 5. In this embodiment, first cleat 531 is disposed at lateral side 510 of knit outsole representation 502.

Graphical interface system 400 may also include grid lines 504 that may be turned on and off using grid line tool 506. Using grid lines 504 may allow for a user to accurately arrange the positions for each cleat on knit outsole representation. In some embodiments, the density of grid lines 504 may be modified. Additionally, in some embodiments only horizontal grid lines may be used, and in other embodiments only vertical grid lines may be used.

Figure 6:
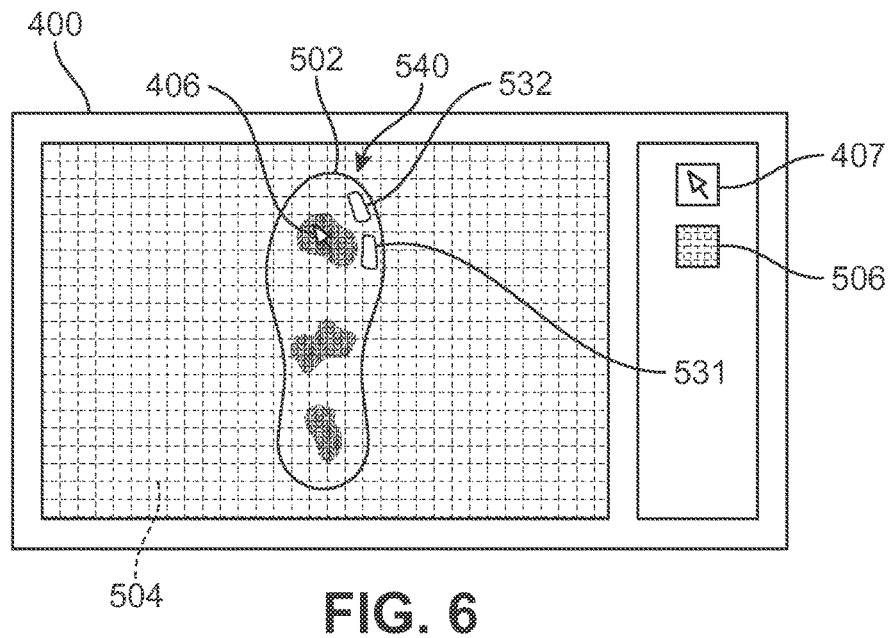
FIG. 6 is an embodiment of a graphical interface system displaying a knit outsole representation.

FIG. 6 is an embodiment of knit outsole representation 502 including first cleat 531 and second cleat 532. In this embodiment, second cleat 532 has been positioned at forward portion 540 of knit outsole representation 502. As with first cleat 531, second cleat 532 may be positioned using pointer 406. In some embodiments, grid lines 504 may be used to determine the preferred spacing between first cleat 531 and second cleat 532.

Figure 7:
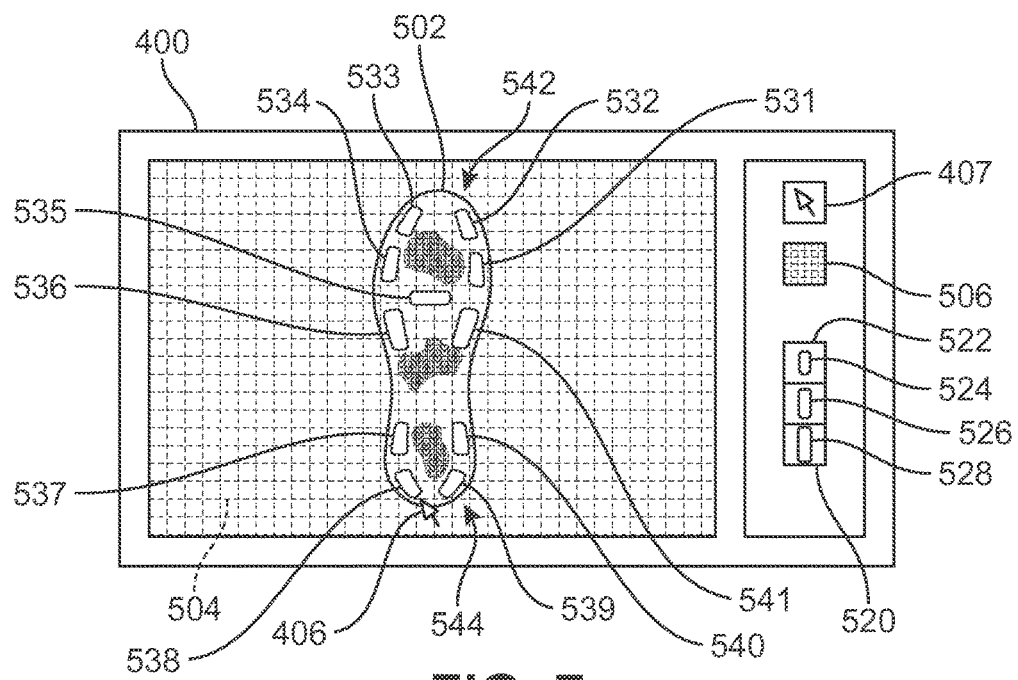
FIG. 7 is an embodiment of a graphical interface system displaying a knit outsole representation.

FIG. 7 is an embodiment of a finished customized cleat arrangement associated with knit outsole representation 502. In this embodiment, first cleat 531, second cleat 532, third cleat 533, fourth cleat 534, and fifth cleat 535 may be disposed on forefoot portion 542 of knit outsole representation 502. Additionally, sixth cleat 536 and seventh cleat 541 are disposed on midfoot portion 543, and eighth cleat 537, ninth cleat 538, tenth cleat 539, and eleventh cleat 540, are disposed on heel portion 544 of knit outsole representation 502.

In addition to the location of each cleat, a user may select a size for each cleat. In some embodiments, graphics toolbar 520 includes a set of cleat sizes 522, including small cleat size 524, medium cleat size 526, and large cleat size 528. This arrangement allows a user to choose the size and location of each cleat.

In the current embodiment, cleats 531-534 and cleats 537-540 may be associated with medium cleat size 526. Cleat 535, cleat 536, and cleat 541 may be associated with large cleat size 528. This configuration may allow a user's heel to penetrate firmly into the ground during circumstances where their feet are flat on the ground, but limit the degree of penetration of the forefoot into the ground during motions such as running, where only a portion of the heel is contacting the ground.

Although knit outsole representation 502 is shown within graphical interface system 400 as a top down view, in other embodiments, the orientation or view of knit outsole representation 502 may be changed. In some embodiments, this may include a provision for moving knit outsole representation 502 to various regions of graphical interface system 400. In other embodiments, this may include a provision for rotating knit outsole representation 502 about a set of axes. Modifying the view of knit outsole representation 502 may better facilitate the user in designing a customized cleat arrangement.

In another embodiment, a customized cleat arrangement can be determined by measuring one or more characteristics of a foot of a customer. For example, in one embodiment, a clerk at a retail store may use pressure mapping technology to determine customized pressure information about the foot of the customer. The clerk may then record that information and use the information to generate a customized cleat arrangement for the customer.

Often, the type of cleat arrangement needed by a user may be chosen according to various factors such as the type of sport that the article of footwear having a knit outsole may be used with, as well as the position the user or athlete may play. In some cases, graphical interface system 400 may include a group of pre-designed customized cleat arrangements associated with various sports and/or positions. In some embodiments, a user could select one of these pre-designed arrangements and, in some cases, make modifications to them using the previously discussed tools associated with graphical interface system 400.

Figure 8:
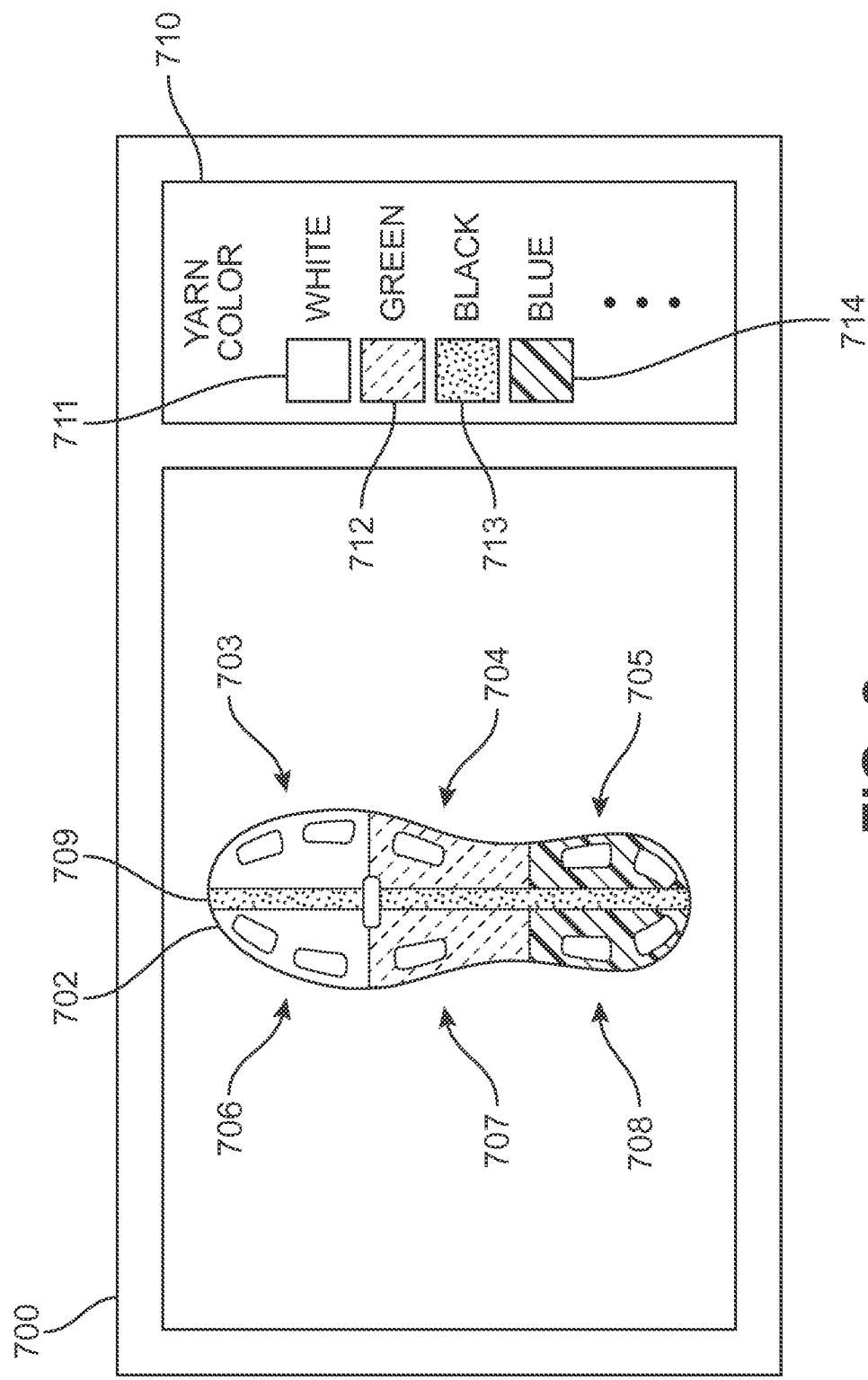
FIG. 8 is an embodiment of a graphical interface system displaying a customized color design on a knit outsole and customized cleat arrangement.

FIG. 8 is an embodiment of graphical interface 700 for customizing yarn colors for knit outsole representation 702. FIG. 8 illustrates a different color for each of the forefoot portion, the midfoot portion, and the heel portion, and a longitudinal stripe essentially down the middle of the article of footwear. Tool bar 710 displays colors available, including white yarn 711, green yarn 712, black yarn 713, and blue yarn 714. Other colors also may be available. Knit outsole representation 702 illustrates a longitudinal black stripe 709 essentially dividing the knit outsole representation into lateral and medial halves, white forefoot medial portion 703 and white lateral forefoot portion 706, green midfoot medial portion 704 and green midfoot lateral portion 707, and blue heel portion lateral portion 705 and blue heel portion medial portion 708. These and other colors may be included in a customized knit outsole. Both the color selection and the cleat arrangement contribute to the customization of the article of footwear. In other embodiments, other characteristics associated with different yarns may be available, such as types, textures, denier, or other qualities of yarns used to form the various portions of the knit outsole.

In another embodiment, different pre-designed customized cleat arrangements can be associated with different types of medical conditions. For example, a customer with sensitive pressure regions on a particular part of the foot can select a pre-designated customized cleat arrangement that is configured to help avoid applying pressure directly to those pressure regions. In some cases, a user can search for various types of medical conditions using a drop down menu as described above. Examples of medical conditions associated with the foot include, but are not limited to, sesamoiditis, heel spurs, heel fissures, arch pain, as well as other medical conditions associated with the foot. The customization system may then generate a pre-designated customized cleat arrangement according to the selected medical condition. For example, for a customer with sesamoiditis, which is associated with pain at the ball of the foot, a pre-designated customized cleat arrangement may be generated that has few or no cleats disposed near the ball of the foot. At this point, a user may choose to use this pre-designated customized cleat arrangement or the customer may choose to modify the arrangement using the graphical interface system.

In another embodiment, different pre-designed customized midsoles may be associated with different types of medical conditions. For example, a customer with a particular region of the sole of the foot sensitive to pressure, such as a bunion, may seek an arrangement configured to avoid application of pressure to this area. In another embodiment, a customer with heel pain may select a specific configuration in the heel portion.

Additionally, throughout this specification, it should be understood that not only a single article of footwear having a knit outsole, but a pair of footwear having a knit outsole may be designed using midsole and cleat customization system 101. Any designs, tools, or other mechanisms applied to the design of one article of footwear having a knit outsole may likewise be applied to a second, complementary, article of footwear having a knit outsole. The term complementary, as used throughout this specification and in the claims, refers to the association of a left knit outsole associated with a left article of footwear having a knit outsole with a right knit outsole associated with a right article of footwear having a knit outsole and vice-versa.

In some embodiments, a distinct customized cleat arrangement could be applied to a first knit outsole and a second knit outsole. In other words, the complementary knit outsoles need not include identical cleat arrangements or arrangements that are mirror images of each other. This configuration may be useful for a kicker in football who desires a greater number of cleats on the foot that is planted during a kick in order to provide a greater amount of traction, but shorter cleats on the kicking foot. Similarly, a first midsole and a second midsole need not be identical or mirror images of each other.

In other embodiments, a customer may design a customized midsole and cleat arrangement without the use of graphical interface system 400. In some embodiments, for example, a customer could use a form supplied by the manufacturer to design a customized midsole and cleat arrangement associated with an article of footwear having a knit outsole. This form could then be mailed, faxed or otherwise sent to the manufacturer at factory 102. A kit, a deformable device, or a deformable pad that would record relevant characteristics of the user's foot also could be included. In some cases, the customer could travel to a retailer and use a form or other provision provided by the retailer to design a customized cleat arrangement. The retailer could then communicate this customized design using mail, fax, or the Internet, to the manufacturer at factory 102.

FIG. 9 is a schematic diagram illustrating different sources of foot information and how that information is processed to result in information useful for manufacturing a customized midsole. Foot information system 900 operates on foot information obtained from at least two sources. One source of foot information illustrated is database 902, in which the user or others already have stored information. For example, a manufacturer from which the used had bought articles of footwear previously may have put the user's foot information into database 902. Alternatively, a third party may have obtained and saved foot information for the user as a matter of convenience for the user.

Another source of foot information is foot information that is scanned. Scanned foot information may be obtained, for example, at the point of sale, by a digital computer scan or by 3-D imagery. Alternatively, a physical impression of the foot, such as on a paper or in a retentive medium, may be obtained. These and other method of obtaining foot information may be used to provide foot information 904.

User foot information thus obtained 906 may be used in some embodiments in an optional midsole assembly customization step 908. This optional customization assembly step may be helpful when a user seeks to customize the midsole. The midsole footbed, the top surface or upper surface of the midsole may be customized to comport with the bottom of the user's foot to provide comfort and support to the foot.

The midsole top surface also may be customized to accommodate a physical anomaly or provide extra cushioning. The arrangement of the protrusions also may be customized to accommodate such anomalies while still placing the projections in registration with the customized cleat arrangement.

Figure 10:
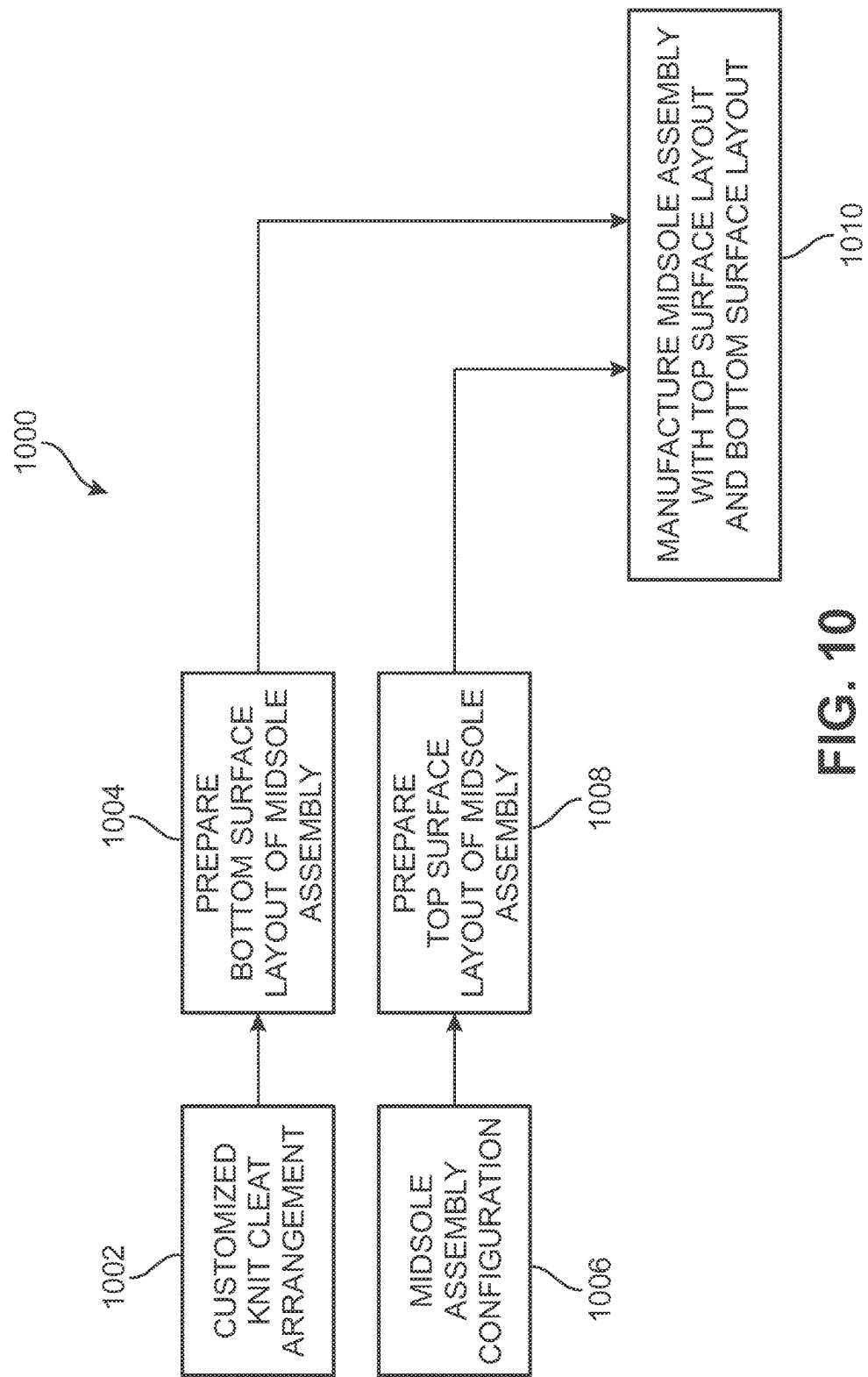
FIG. 10 is an embodiment of a method for customizing a midsole.

FIG. 10 schematically illustrates the steps of manufacturing a midsole having a customized top surface and a customized bottom surface with a projection. Process 1000 includes step 1002 of obtaining the final customized knit cleat arrangement from a remote terminal at which the arrangement was designed, from a manufacturer to which the arrangement was transmitted, or from any source. Customized knit cleat arrangement 1002 is used in step 1004 to prepare a bottom surface of a midsole. The bottom surface may be formed in any suitable manner, including but not limited to molding, carving or shaping (material removal from a larger piece), 3-D printing, or any suitable way. The midsole bottom surface may be formed from rigid materials, such as rigid plastic or metal, or from deformable materials, such as deformable polymers or deformable polymer foams. Rigid materials may be useful in providing reinforcement to the customized cleat arrangement. In some embodiments, the bottom surface is formed by 3-D printing of material that forms a rigid shape.

Midsole assembly configuration 1006 is used to prepare the top surface layout at step 1008. The top surface may be the foot-enclosing portion of the midsole. The top surface layout prepared at step 1008 then is used to manufacture a top surface on a midsole at step 1010. The top surface may be rigid or flexible. In some embodiments, the top surface is rigid, with minimal flexibility, to provide support and rigidity to the knit outsole surface.

A customized top surface is formed to the shape of the bottom of the user's foot. A rigid surface not only provides support to the knit outsole surface, but also provides support to the user's foot. An insole (not shown), such as a foot-shaped cushioning pad, may be used to provide comfort and cushioning, especially with a rigid midsole.

The midsole that results from manufacturing assembly 1010 may be unitary or may be assembled for multiple pieces of material. In some embodiments, the top surface of the midsole and the bottom surface, including the projections, of a midsole, may be formed from different compositions of matter. In some embodiments, a midsole is formed by 3-D printing.

Figure 11:
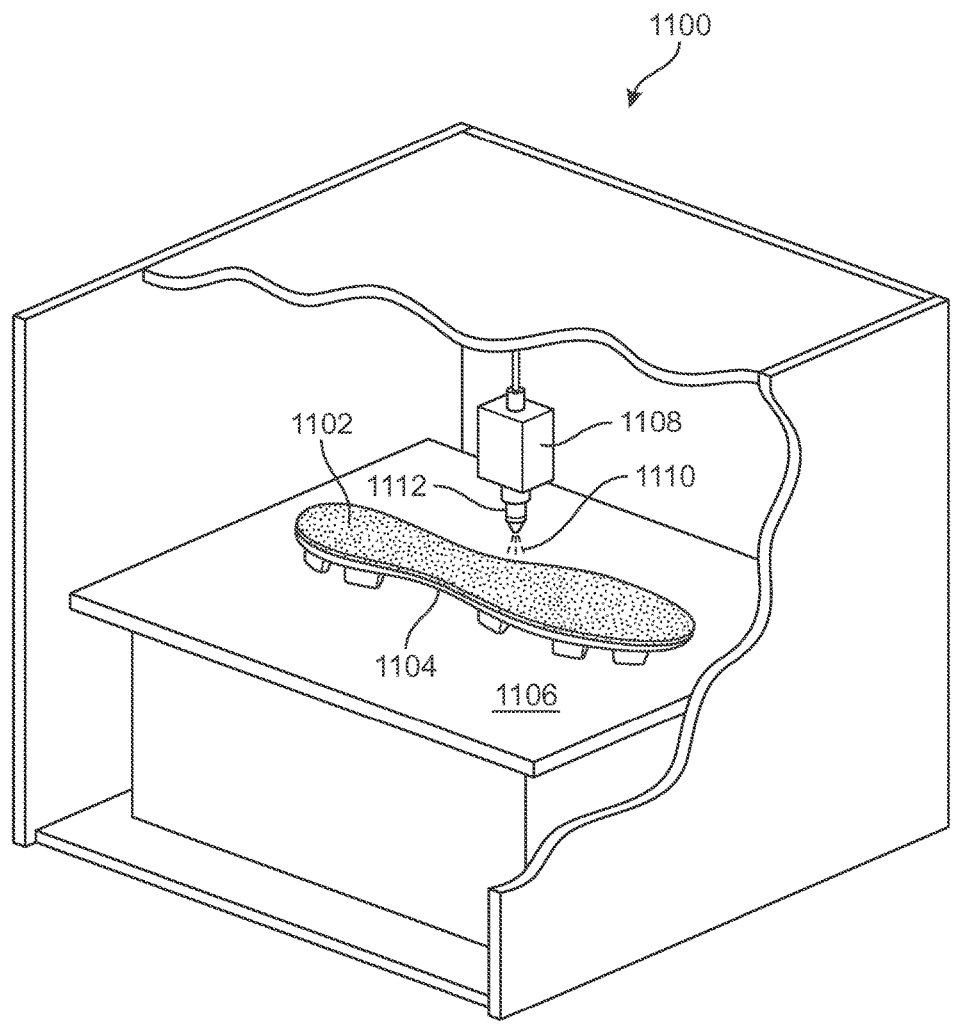
FIG. 11 is an embodiment of a step of 3-D printing of a customized midsole.

FIG. 11 illustrates a method of forming midsole 1102 in 3-D printer 1100. Midsole 1102 is in place on knit outsole 1104 on shelf or table 1106. The composition of matter forming the midsole may be any material that is amenable of 3-D printing. 3-D print head 1108 may deliver material 1110 through nozzle 1112. A computer (not shown) may control the deposition of material 1110 by controlling the delivery rate of material through nozzle 1112 and the location of nozzle 1110. The process is repeated at different areas of the midsole, with material 1110 accreting to the midsole until the design is completely formed.

Various methods, machines, and tools can be used for forming, treating, and otherwise adjusting knitted component 1400 as a knit outsole herein. It will be appreciated that the order of steps within the method may vary from the order described herein. Certain steps or aspects of some steps may be skipped or eliminated as well. Moreover, two or more steps within the method may be carried out sequentially or simultaneously. Furthermore, the steps within the method may be carried out manually or automatically, using any suitable tool, machine, or implement.

Figure 12:
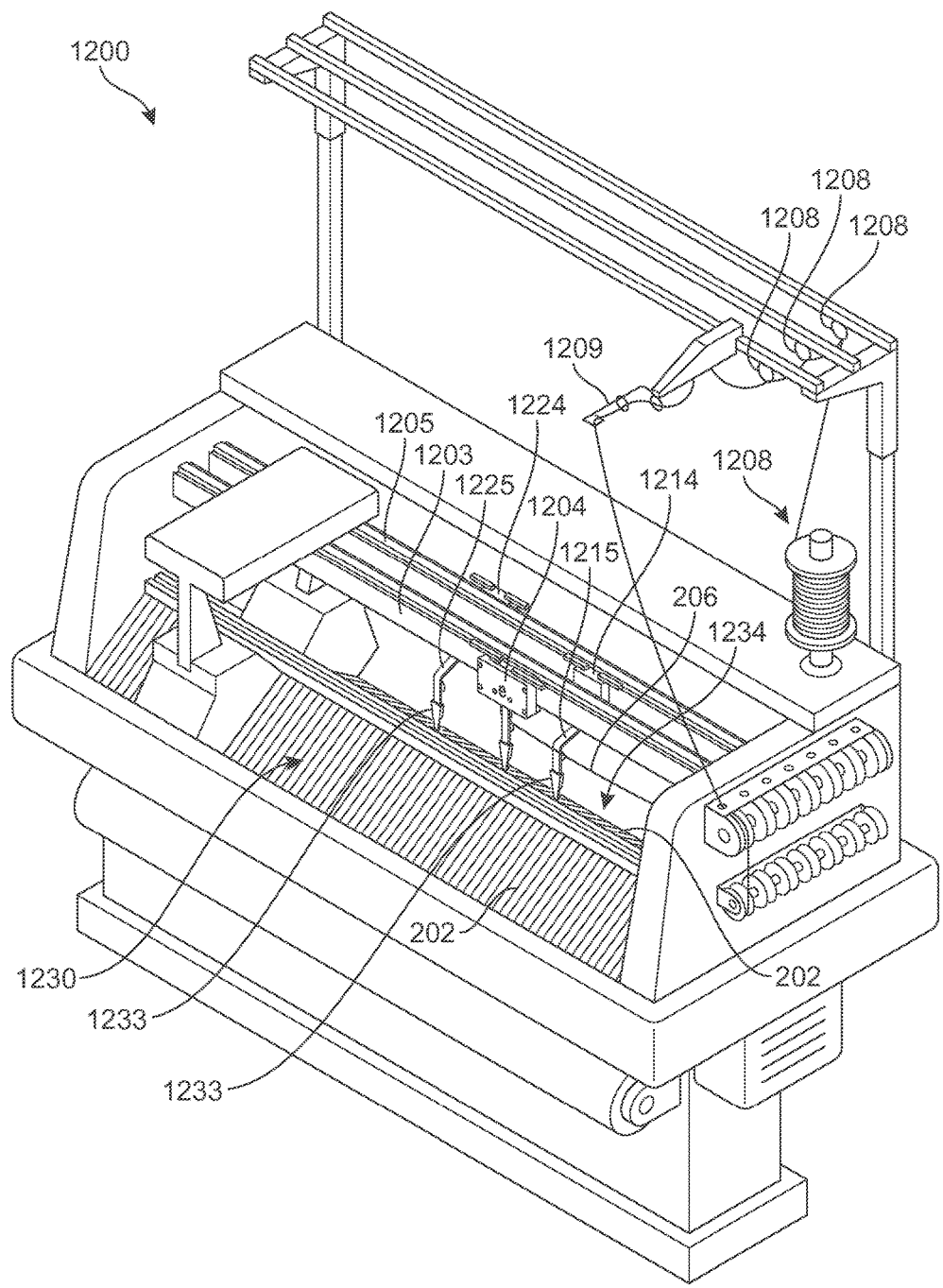
FIG. 12 is an embodiment of a knitting machine for knitting a knit.
Figure 13:
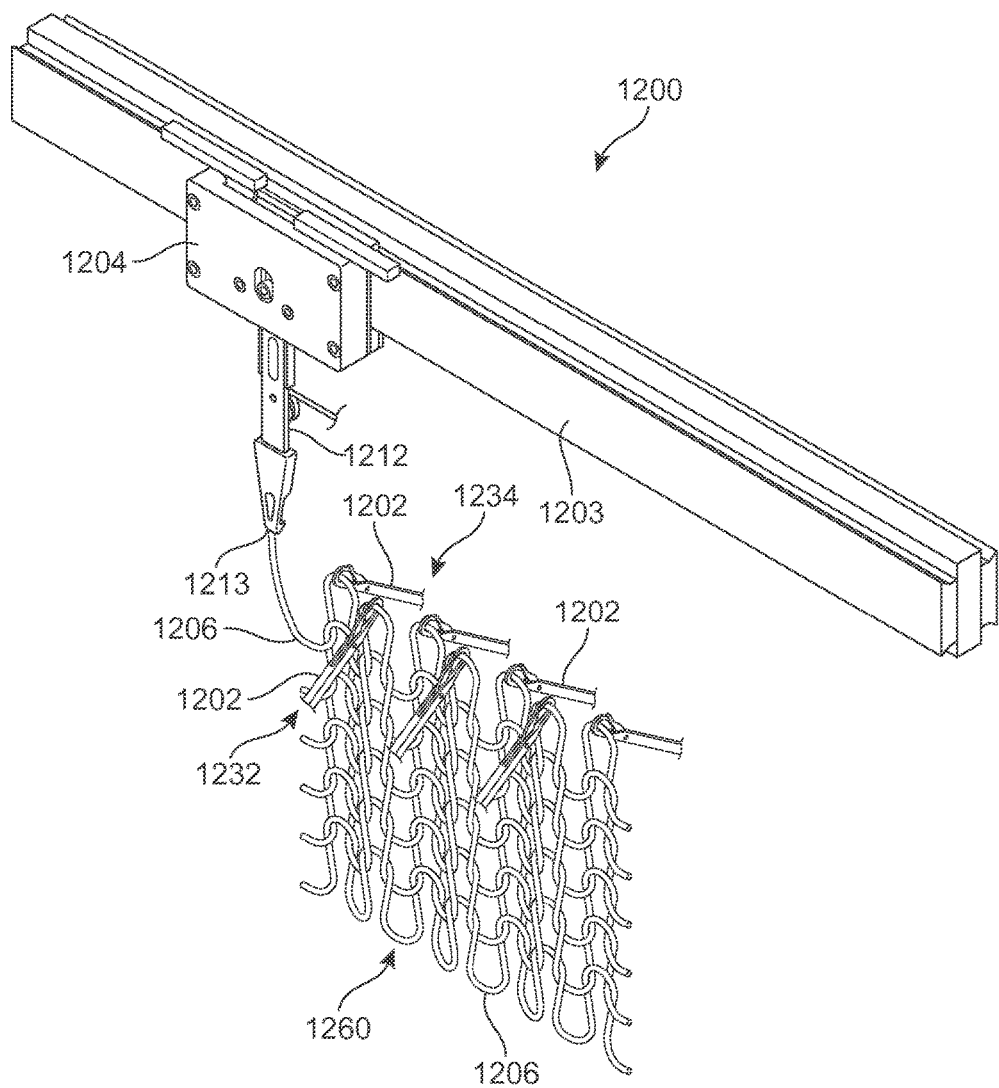
FIG. 13 is an embodiment of knitting a knit textile element.

FIG. 12 and FIG. 13 illustrate an exemplary process of knitting a knitted component 1400, which may include elements such as a knit outsole. Although knitting may be performed by hand, the commercial manufacture of knitted components is generally performed by knitting machines. An example of a knitting machine 1200 that is suitable for producing any of the knitted components described herein is depicted in FIG. 12. Knitting machine 1200 has a configuration of a V-bed flat knitting machine for purposes of example, but any of the knitted components described herein may be produced on other knitting machines.

Knitting machine 1200 includes first needle bed 1232 and second needle bed 1234 having needles 1202 that are angled with respect to each other, thereby forming a V-bed. That is, needles 1202 from first needle bed 1232 lay on a first plane, and needles 1202 from the second needle bed 1234 lay on a second plane. The first plane and the second plane are angled relative to each other and meet to form an intersection that extends along a majority of a width of knitting machine 1200. As described in greater detail below, needles 1202 each have a first position where they are retracted and a second position where they are extended. In the first position, needles 1202 are spaced from the intersection where the first plane and the second plane meet. In the second position, however, needles 1202 pass through the intersection where the first plane and the second plane meet.

Rail 1203 and rail 1205 extend above and parallel to the intersection of needles 1202 and provide attachment points for standard feeder 1204. Rail 1203 and rail 1205 each have two sides, each of which may accommodate one standard feeder. Therefore, knitting machine 1200 may include a total of four feeders. Three such feeders are illustrated in FIG. 10. Standard feeder 1204 is on the front of rail 1203, feeder 1214 is on the front of rail 1205, and feeder 1224 is on the back of rail 1205. Although two rails are depicted, additional rails could be present. Such additional rails would accommodate additional feeders. Such feeders may be useful to manufacture embodiments including two or more types of yarn. These additional feeders are supplied with yarn and are operated in the same way as the feeders described in detail.

Feeder 1204 moves along rail 1203 and needle beds 1232 and 1234, thereby supplying yarn to needles 1202. Yarn 1206 is provided to feeder 1204 by a spool 1207. More particularly, yarn 1206 extends from spool 1207 to various yarn guides 1208, yarn take-back spring 1209, and yarn tensioner 1210 before entering feeder 1204. Although not depicted, additional spools 1207 may be utilized to provide yarns to other feeders.

Standard feeders are conventionally utilized for a V-bed flat knitting machine 1200. Each feeder has the ability to supply yarn that needles 1202 manipulate to knit, tuck, and float. In some embodiments, only one feeder may be needed. In other embodiments, such as when the ground-engaging cleat members are knitted into the one-piece outsole, more than one feeder may be utilized. For such embodiments, a knitting machine 1200 in FIG. 12 may include first standard feeder 1204, second standard feeder 1214, and third standard feeder 1224 that are substantially similar to each other. First standard feeder 1204 may be secured to a front side of rail 1203, second standard feeder 1214 may be secured to a front side of rail 1205, and third standard feeder 1224 may be secured to a rear side of rail 1205. In other embodiments of the disclosure, additional feeders may be used and may be located on the front or rear side of rail 1203.

In this embodiment, first yarn 1206 from spool 1207 passes through first standard feeder 1204 and an end of yarn 1206 extends outwardly from first dispensing tip 1213 at the end of first feeder arm 1212. Although yarn 1206 is depicted, any other strand (e.g., a filament, thread, rope, webbing, cable, chain, or yarn) may pass through first standard feeder 1204. A second yarn (not shown) similarly passes through second standard feeder 1214 and extends outwardly from second dispensing tip 1233 on second feeder arm 1215. A third yarn (not shown) may pass in a similar manner through third standard feeder 1224 to third dispensing tip 1233 on third feeder arm 1227.

Needles 1202 are manipulated to form loops 1206, with a plurality of loops forming knitted component 1260. The knitting process discussed herein relates to the formation of a knitted component 1260, which may be any knitted component, including a component that includes a textile element such as a knit outsole. For purposes of the discussion, only a relatively small section of knitted component 1260 is shown in the Figures in order to permit the knit structure to be illustrated. Moreover, the scale or proportions of the various elements of knitting machine 1200 and knitted component 1260 may be enhanced to better illustrate the knitting process.

First standard feeder 1204 includes first feeder arm 1212 with first dispensing tip 1213. First feeder arm 1212 is angled to position first dispensing tip 1213 in a location that is (a) centered between needles 1202 and (b) above an intersection of needle beds 1201. Note that needles 1202 lay on different planes, which planes are angled relative to each other. That is, needles 1202 lay on the different planes of first needle bed 1232 and second needle bed 1234. Needles 1202 each have a first position in which needles 1202 are retracted, and a second position, in which needles 1202 are extended. In the first position, needles 1202 are spaced from the intersection where the planes upon which needle beds 1201 meet. In the second position, however, needles 1202 are extended and pass through the intersection where the planes upon which needle beds 1201 meet. That is, needles 1202 cross each other when extended to the second position. It should be noted that first dispensing tip 1213, second dispensing tip 1223, and third dispensing tip 1233, are located above the intersection of the planes. In this position, first dispensing tip 1213, second dispensing tip 1223, and third dispensing tip 1233 supply yarn to needles 1202 for purposes of knitting, tucking, and floating.

Referring again to FIG. 13, first standard feeder 1204 moves along rail 1203 and a new course is formed in knitted component 1260 from yarn 1206. More particularly, needles 1202 pull sections of yarn 1206 through the loops of the prior course, thereby forming the new course. Accordingly, courses may be added to knitted component 1260 by moving standard feeder 1204 along needles 1202, thereby permitting needles 1202 to manipulate yarn 1206 and form additional loops from yarn 1206.

The processes and methods for knitting a knitted component described and illustrated herein are exemplary and are not meant to be exhaustive. Therefore, it should be understood that additional knitted components including the features of the embodiments described herein, as well as similar knitted components including the features of the embodiments described herein, as well as similar knitted components not explicitly described herein, may be made using one or more knitting processes substantially similar to the knitting method for knitted components described herein or in the documents incorporated by reference.

Knitted components described herein can be formed from at least one yarn that is manipulated (e.g., with a knitting machine) to form a plurality of intermeshed loops that define a knitted component having a variety of courses and wales. Thus, adjacent areas of a knitted component can share at least one common course or at least one common wale. That is, knitted components can have the structure of a knitted textile. It will be appreciated that the knitted components can be formed via weft knitting operations, including flat knitting operations and circular knitting operations, warp knitting operations, or other suitable methods.

The knitted components may Incorporate various types and combinations of stitches and yarns. With regard to stitches, the yarn forming the knitted components may have one type of stitch in one area of a knitted component and another type of stitch in another area of the knitted component. Depending upon the types and combinations of stitches utilized, areas of knitted components may have a plain knit structure, a mesh knit structure, or a rib knit structure, for example. The different types of stitches may affect the physical properties of a knitted component, including aesthetics, stretch, thickness, air permeability, and abrasion-resistance. That is, the different types of stitches may impart different properties to different areas of the knitted component. With regard to yarns, the knitted component may have one type of yarn in one area and another type of yarn in a different area of the knitted component.

Although embodiments of the disclosure have been described in detail as providing an upper comprising a single layer, the disclosure also contemplates uppers having plural layers. The plural layers may be fused, double-knit, or otherwise associated with each other.

Figure 14:
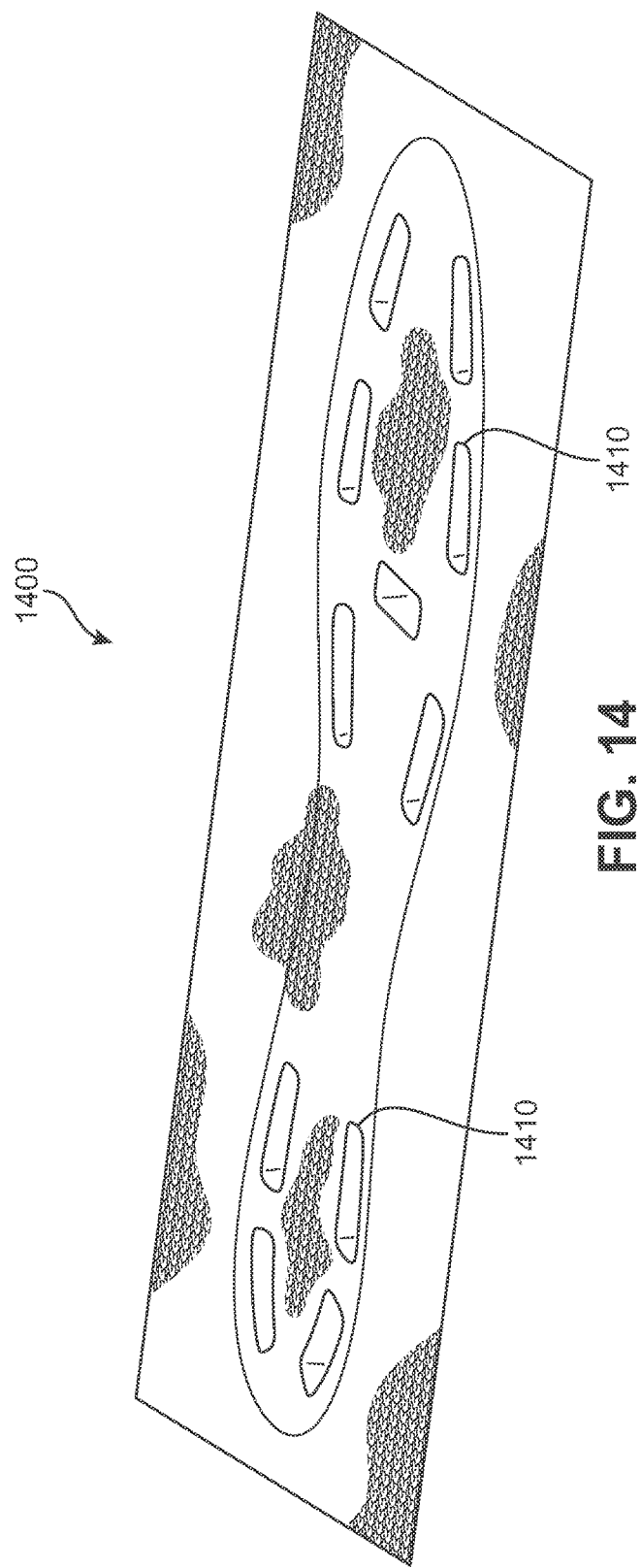
FIG. 14 is a perspective view of an embodiment of a knit outsole portion with a custom cleat location.

FIG. 14 illustrates a portion of knitted component 1400. In particular, the portion illustrated is that portion in which the customized cleat arrangement 1410 has been formed.

Knitted component 1400, which may include a textile element, such as embodiments of the knit outsole, is knit in accordance with an appropriate method. Ground-engaging cleat members may be formed. The textile may be steamed to set the yarn, in accordance with known processes. Then, areas of the textile element may be stiffened. Typically, such stiffening would be useful in areas of the textile element subject to heavy abrasion. Fusible yarn may be used in this area, for example, on portions of knitted components corresponding to protuberances forming ground-engaging cleat members. Fusible yarn may be heated to soften the outer surfaces of the yarn. Alternatively, a stiffening resin or plastic may be applied and activated and cured or heated. Then, the final folding, matching, sticking and adhering to form the article of footwear is carried out to form an article of footwear.

Knitted components, including knit outsole elements, may be formed of unitary knit construction. As used herein, the term "unitary knit construction" means that the respective component is formed as a one-piece element through a knitting process. That is, the knitting process substantially forms the various features and structures of unitary knit construction without the need for significant additional manufacturing steps or processes. A unitary knit construction may be used to form a knitted component having structures or elements that include one or more courses of yarn or other knit material that are joined such that the structures or elements include at least one course in common (i.e., sharing a common yarn) and/or include courses that are substantially continuous between each of the structures or elements. With this arrangement, a one-piece element of unitary knit construction is provided. Examples of various configurations of knitted components and methods for forming knitted components with unitary knit construction are disclosed in U.S. Pat. No. 6,931,762 to Dua; U.S. Pat. No. 7,347,011 to Dua, et al.; U.S. Patent Application Publication 2008/0110048 to Dua, et al.; U.S. Patent Application Publication 2010/0154256 to Due; and U.S. Patent Application Publication 2012/0233882 to Huffa, et al.; each of which is incorporated herein by reference in its entirety. A knitted component remains formed of unitary knit construction when other elements, such as logos, trademarks, placards with care instructions or other information, such as material information and size, tensile or structural elements, are added following the knitting procedure.

Figure 15:
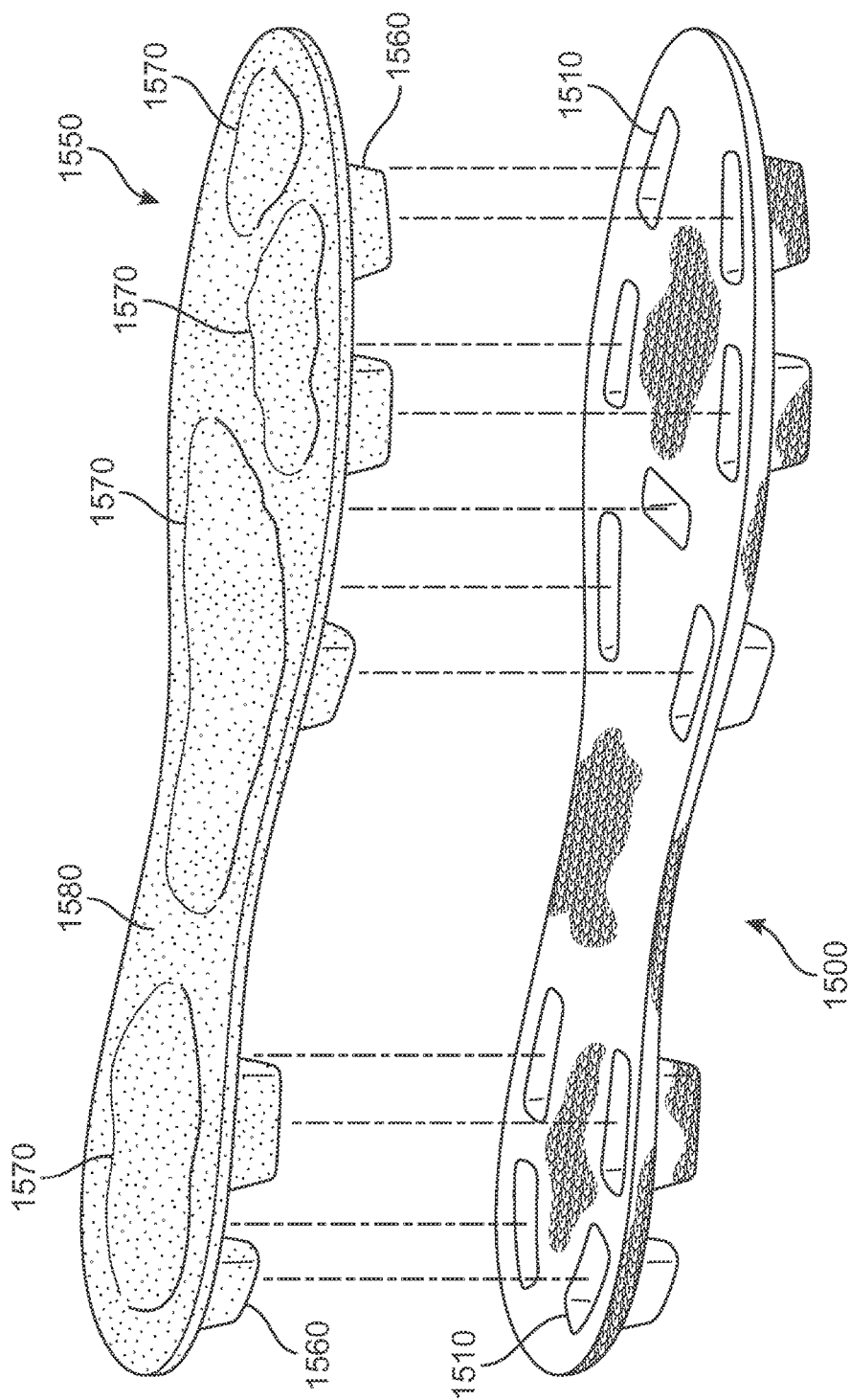
FIG. 15 is a representation of the relationship between a customized midsole and a customized knit outsole.

FIG. 15 illustrates the relationship between customized knit outsole 1500 and customized midsole 1550. Customized knit outsole 1500 includes customized cleat arrangement 1510. Customized midsole 1550 includes a customized arrangement of protrusions 1560 in registration with the customized cleat arrangement, as illustrated. Customized midsole 1550 also includes customized areas 1570 of top surface 1580.

Figure 16:
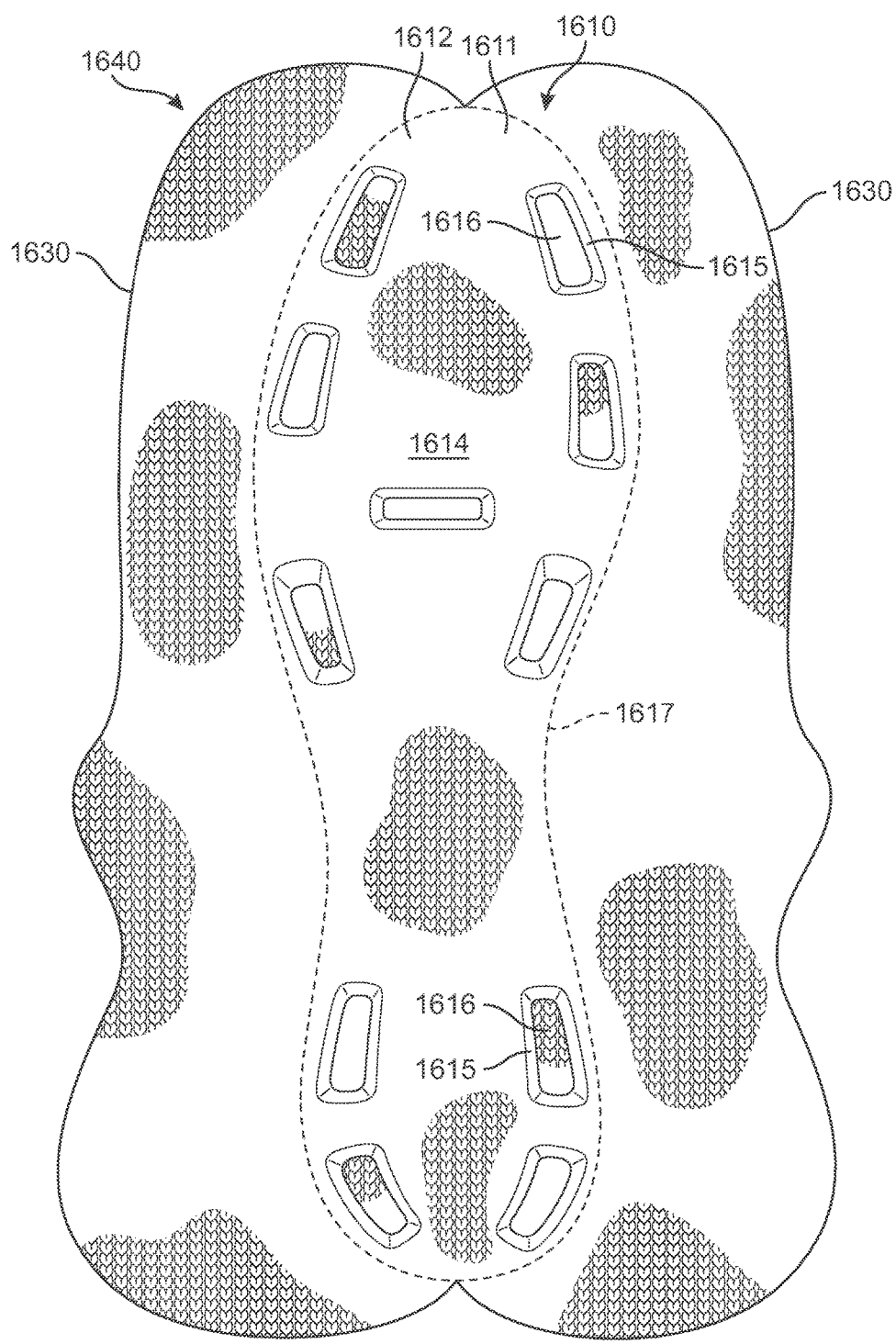
FIG. 16 is a bottom view of an exemplary embodiment of an article of footwear having a knit outsole having a customized cleat arrangement before a foot-enclosing portion is formed.

FIG. 16 illustrates knitted component 1630 that includes customized knit outsole 1611 and foot-enclosing knit portion 1640 formed of a unitary knit construction, FIG. 16 illustrates an essentially planar or flat foot-enclosing knit portion 1640 comprising sole system 1610 and knitted component 1630. Knitted component 1630 is illustrated in two elements on opposite sides of sole system 1610. Sole system 1610 includes knitted component 1611, one-piece knit outsole 1612 having bottom surface 1614, and ground-engaging cleat member 1615 having bottom 1616. Line of demarcation 1617 is illustrated for purposes of reference. The line of demarcation is not a physical object, but rather is an aid to visualizing the regions of the knitted component. Further, the protrusions of a customized midsole have been inserted into the cleats of the customized knit outsole 1612. The perimeter of the customized midsole essentially coincides with line of demarcation 1617. When knitted component 1630 is manipulated to form a foot-enclosing portion, the customized midsole will serve as an object over which the knit element is folded.

Figure 17:
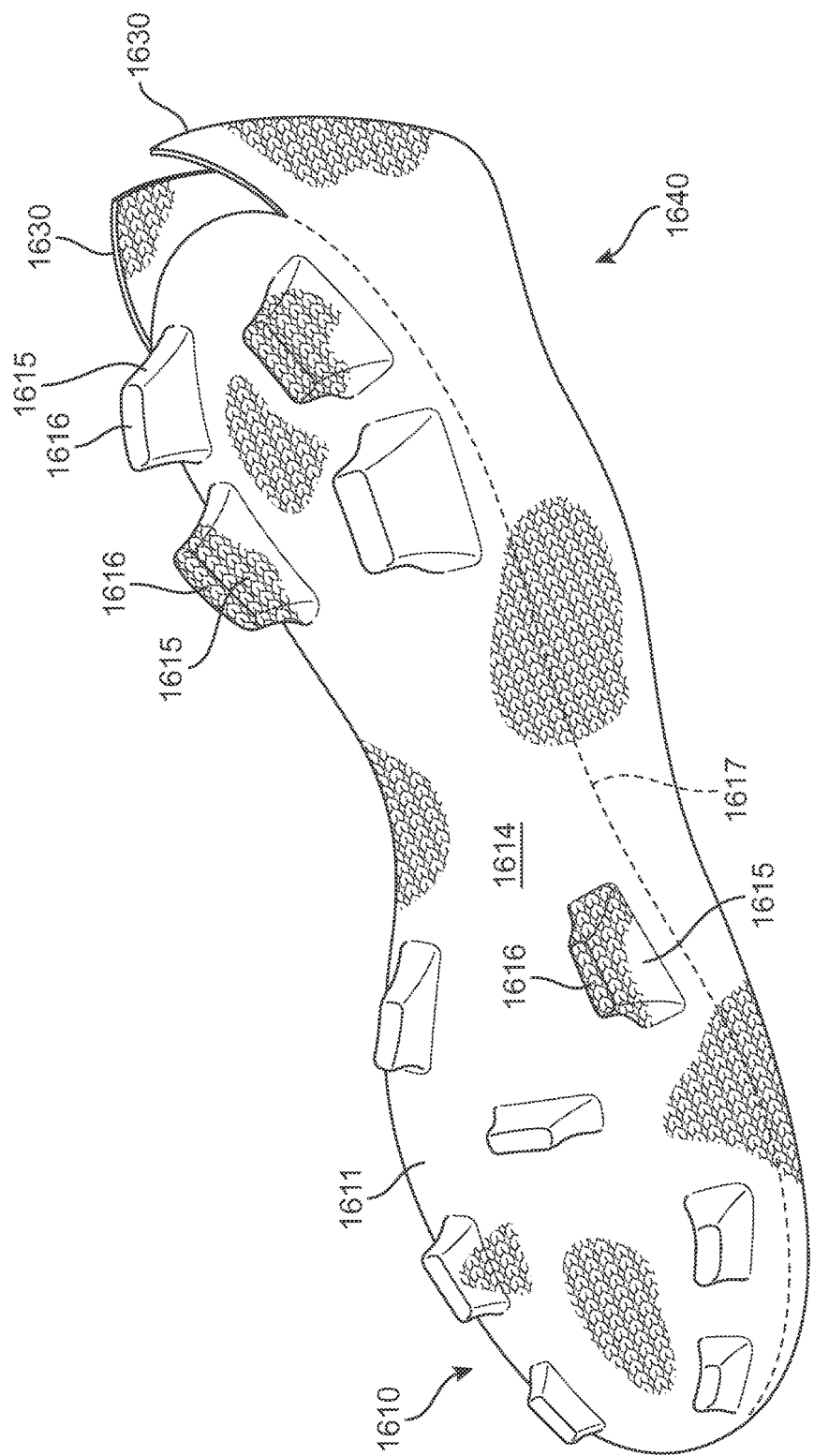
FIG. 17 is a perspective view of the bottom of an exemplary embodiment of the article of footwear having a knit outsole of FIG. 16 as the foot-enclosing portion is formed.
Figure 18:
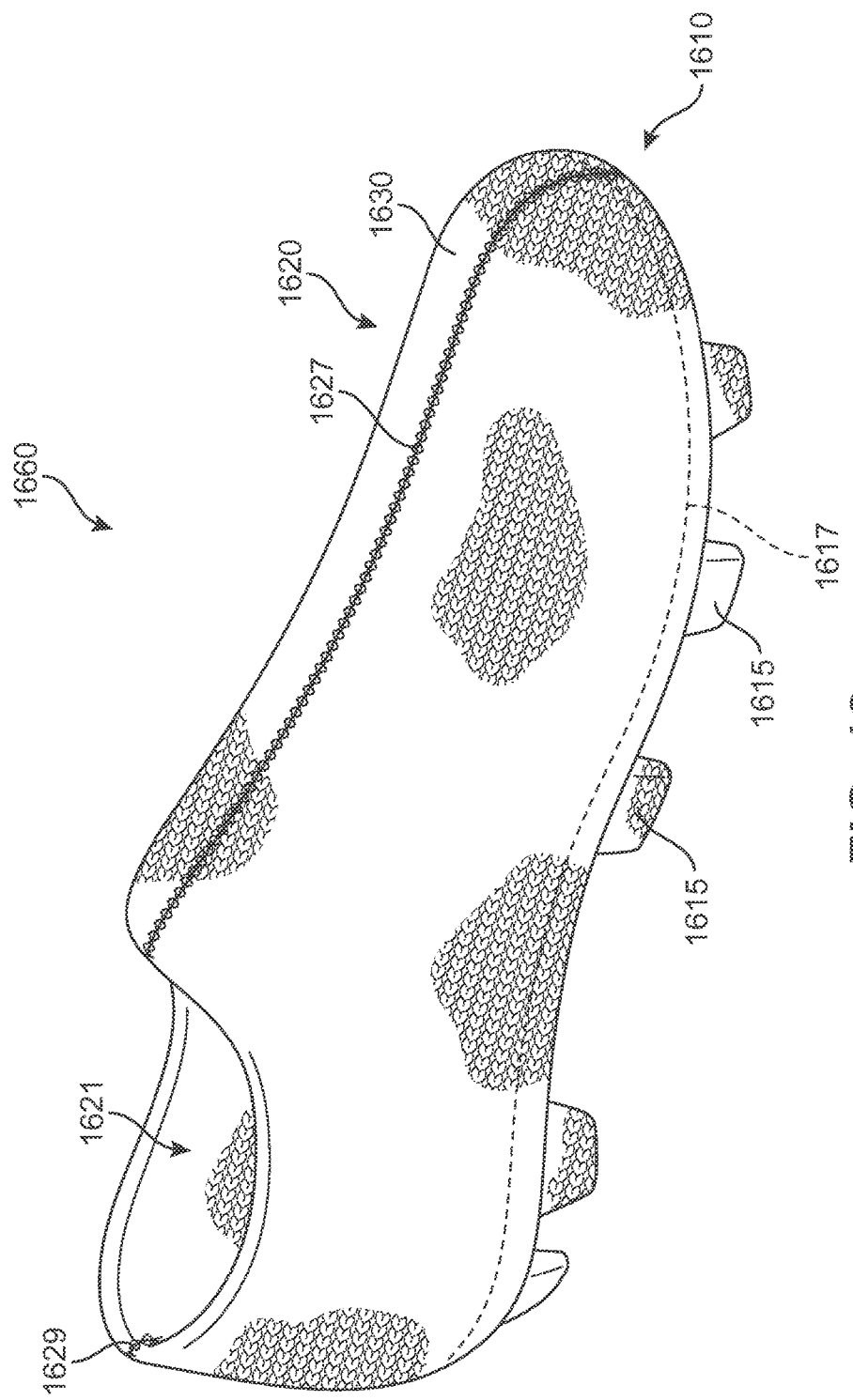
FIG. 18 is perspective view of an exemplary embodiment of the completed article of footwear having a knit outsole of FIG. 16 and FIG. 17.

FIG. 16, FIG. 17, and FIG. 18 illustrate an exemplary process of forming article of footwear 1660 from foot-enclosing knit portion 1640, which is flat or planar in FIG. 16, and is configured into a completed article of footwear 1660 in FIG. 18, FIG. 17 illustrates an intermediate stage, wherein foot-enclosing knit portion 1640 has been folded or bent upward from about line of demarcation 1617, clearly distinguishing sole system 1610 from knitted component 1630. Knitted component 1611, one-piece knit outsole 1612 having bottom surface 1614, and ground-engaging cleat member 1615 having bottom 1616 are clearly visible as part of sole system 1610. In FIG. 17, the forefoot area is completely formed, but the elements of knitted component 1630 have not been brought together.

FIG. 18 illustrates a complete article of footwear 1660 from foot-enclosing knit portion 1640. Article of footwear 1660 comprising knitted component 1630 and sole system 1610. Upper 1620 is formed by stitching or otherwise attaching the ends of knitted component 1630 at seam 1627 in the forefoot region and the midfoot region and at seam 1629 in the heel region to form a void for a user's foot.

In some embodiments, seam 1627 and seam 1629 resulting from the stitching or joining together of the sides of knitted component 1630 may be located essentially on the longitudinal midline of article of footwear 1660 if the size of knitted component 1630 is essentially the same on each side of article of footwear 1660, as illustrated in the drawing Figures herein. In other embodiments of the disclosure, the seam may be located anywhere on the surface of upper 1620. Such an adjustment can be made by making one side of knitted component 1630 wider than the other.

Line of demarcation 1617 illustrates a dividing line between sole system 1610 and other components of the article of footwear 1660. Ground-engaging cleat member 1615 protrudes away from the bottom side or surface 1614 of one-piece knit outsole 1612.

Figure 19:
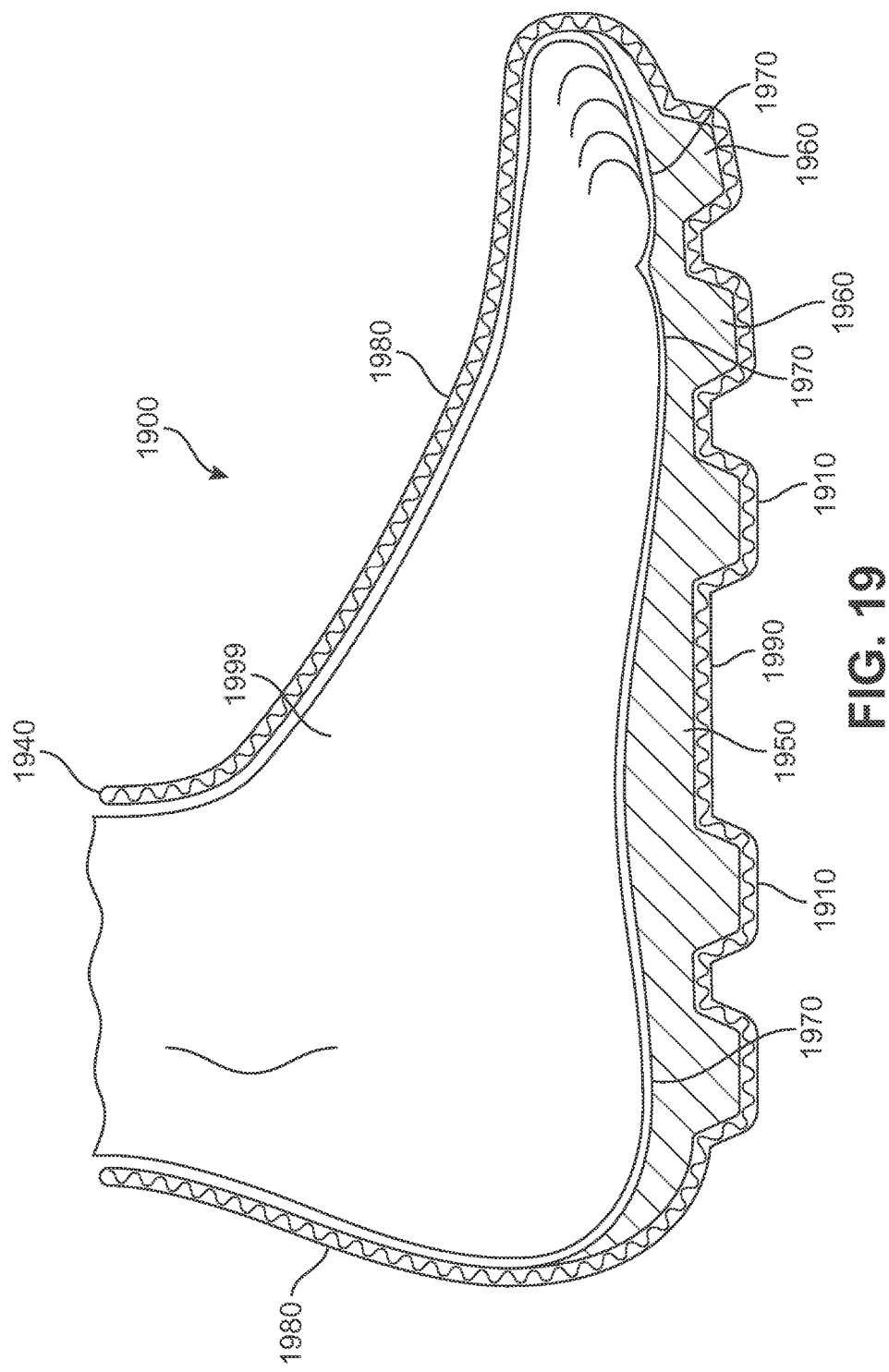
FIG. 19 is a cross-sectional view of a user's foot in an article of footwear having a knit outsole.

FIG. 19 is an illustration in cross-section of a foot 1999 inside a finished shoe 1900 in accordance with embodiments of the invention. Customized midsole 1950, including customized top surface 1970 and projections 1960 arranged in registration with the cleats in customized cleat arrangement 1910, Knit element 1940 extends around and encloses the foot. Knit element includes knit outsole 1900 and knit foot-enclosing portion 1980.

Figure 20:
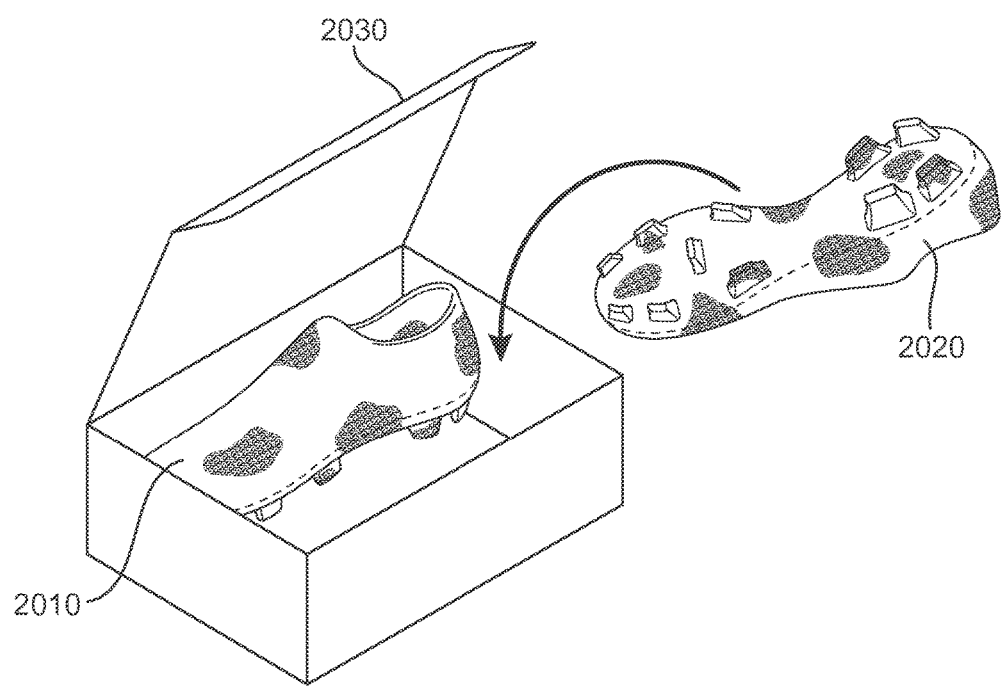
FIG. 20 is an embodiment of a pair of footwear having a knit outsole being prepared and shipped to a pre-designated address.

The article of footwear produced may be delivered to the user. In some embodiments, the article of footwear will be put into a container and delivered to the user. In some embodiments, a matched pair of articles of footwear is prepared, as illustrated in FIG. 20. Once assembled footwear 2010 may be associated with complementary assembled footwear 2020 and shipped in container 2030 to a pre-designated address as supplied by the customer. In some embodiments, complementary assembled footwear 2010 has been customized according to a process similar to the process described here for customizing the cleat arrangement of assembled footwear 2010.

While various embodiments of the invention have been described, the description is intended to be exemplary rather than limiting, and it will be apparent to those of ordinary skill in the art that many more embodiments and implementations are possible that are within the scope of the embodiments. Accordingly, the embodiments are not to be restricted except in light of the attached claims and their equivalents. Also, various modifications and changes may be made within the scope of the attached claims. As used in the claims, the phrase "any of", when identifying previous claims, is intended to mean (i) any one claim or (ii) any combination of two of more claims identified.

What is claimed is:

1. A method for producing a customized midsole and a customized cleat arrangement for an article of footwear comprising a knit outsole, the method comprising the steps of:
   providing a cleat graphical interface system;
   providing a set of cleat graphics tools associated with the cleat graphical interface system;
   providing a group of pre-designed cleat arrangements, each pre-designed cleat arrangement in the group of pre-designed cleat arrangements including a knit outsole representation having pre-defined cleat locations and a pre-defined number of cleats;
   providing a midsole graphical interface system;
   providing a set of midsole graphics tools associated with the midsole graphical interface system;
   providing a group of pre-designed midsoles, each pre-designed midsole in the group of pre-designed midsoles including reinforcement members projecting from the bottom of the midsole;
   receiving from the cleat graphical interface system information related to a customized cleat arrangement, the customized cleat arrangement including at least knit outsole representation associated with a selected one pre-designed cleat arrangement from the group of pre-designed cleat arrangements that has been modified to change at least one of the pre-defined cleat locations and the pre-defined number of cleats;
   receiving from the midsole graphical interface system information related to a customized midsole, the customized midsole including at least one representation of the impression of the user's foot or of the reinforcement members associated with a selected one pre-designed midsole arrangement from the group of pre-designed midsole arrangements that has been modified to change at least one of the pre-defined reinforcement locations and the representation of the impression of the user's foot; and
   producing an article of footwear with the customized midsole and the customized cleat arrangement including the at least one knit outsole representation having at least one changed pre-defined cleat location and changed pre-defined number of cleats and including a customized midsole including at least one changed pre-defined location or changed pre-defined number of cleats and a modified midsole representation having at least one changed representation of the impression of the user's foot or reinforcing member.

2. The method according to claim 1, wherein the graphical interface system is accessible via a network.

3. The method according to claim 2, wherein the network is the Internet.

4. The method according to claim 1, wherein the step of producing the article of footwear includes a step of molding the knit outsole to form a cleat member;
   wherein locations and number of molds correspond to the at least one changed pre-defined cleat locations and changed pre-defined number of cleats in the customized cleat arrangement.

5. The method according to claim 4, wherein the group of pre-designed cleat arrangements includes a plurality of types of cleat arrangements according to pre-determined criteria.

6. The method according to claim 1, wherein the pre-determined criteria is at least one of a degree of traction, a sport, and a medical condition.

7. The method according to claim 6, wherein the pre-determined criteria are a sport and a position; and wherein the group of pre-designed cleat arrangements include at least one cleat arrangement associated with a first sport and a first position and at least one cleat arrangement associated with the first sport and a second position.

8. The method according to claim 1, wherein the step of producing the article of footwear includes producing a pair of complementary articles of footwear having the customized midsole and customized cleat arrangement.

9. The method according to claim 8, wherein the step of producing the article of footwear includes producing a pair of complementary articles of footwear having a pair of knit outsole representations, wherein the pair of outsole representations includes:
   a first knit outsole representation associated with a first article of footwear, the first knit outsole representation having a first pre-determined location and number of cleats; and
   a second knit outsole representation associated with a second article of footwear, the second article of footwear being complementary to the first article of footwear to form the pair of complementary articles of footwear, the second knit outsole representation having a second pre-determined location and number of cleats;
   wherein the second pre-determined location and number of cleats is different from the first pre-determined location and number of cleats.

10. The method according to claim 1, wherein the customized cleat arrangement includes a chosen cleat size.

11. A method for customizing an article of footwear comprising a sole system including a knit outsole and a midsole;
   the knit outsole having a ground-engaging side and a top side;
   the ground-engaging side including a location for a ground-engaging cleat member;
   the midsole having a top side and a bottom side having a rigid protrusion;
   the top side of the midsole customized to the user's foot;
   the location and size of the rigid protrusion customized to the user;
   the method comprising:
   selecting a pre-designed cleat arrangement from a group of pre-designed cleat arrangements, the pre-designed cleat arrangement including a representation of the knit outsole having pre-defined cleat locations and a pre-defined number of cleats;
   knitting the knit outsole such that the knit outsole has the pre-defined cleat arrangement;
   permanently installing the bottom side of the midsole in contact with the top side of the outsole with the rigid protrusion on the bottom of the midsole in registration with the location for the ground-engaging cleat member; and
   pressing the bottom side of the midsole into the knit outsole to stretch the knit outsole in the location for the ground-engaging cleat member to permanently install the midsole and to form the ground-engaging cleat member.

12. A method for customizing an article of footwear comprising a sole system including a knit outsole and a midsole;
   the knit outsole having a ground-engaging side and a top side;
   the ground-engaging side including a knit member extending away from the ground-engaging side;

the midsole having a top side and a bottom side having a rigid protrusion;
the top side of the midsole customized to the user's foot;
the location and size of the rigid protrusion customized to the user and located in registration with the knit member on the ground-engaging side;
the method comprising:
selecting, with a graphic interface system, a pre-designed cleat arrangement from a group of pre-designed cleat arrangements, the pre-designed cleat arrangement including a representation of the midsole having pre-defined cleat locations and a pre-defined number of cleats;
permanently installing the bottom side of the midsole in contact with the top side of the outsole with the rigid protrusion on the bottom of the midsole in registration with the ground-engaging cleat member; and
pressing the bottom side of the midsole into the knit outsole to permanently install the midsole and to form the ground-engaging cleat member.

13. A method for customizing an article of footwear comprising a one-piece knitted component that encloses the foot and includes a sole system including a knit outsole and a midsole;
the knit outsole having a ground-engaging side and a top side;
the ground-engaging side including a location for a ground-engaging cleat member;
the midsole having a top side and a bottom side having a rigid protrusion;
the top side of the midsole customized to the user's foot;
the location and size of the rigid protrusion customized to the user;
the method comprising:
selecting a pre-designed cleat arrangement from a group of cleat arrangements, the cleat arrangement having cleat locations and a number of cleats;
displaying a representation of the midsole having the cleat locations and the number of cleats;
displaying a representation of the knit outsole having the cleat locations and the pre-defined number of cleats;
permanently installing the bottom side of the midsole in contact with the top side of the outsole with the rigid protrusion on the bottom of the midsole in registration with the location for the ground-engaging cleat member; and
pressing the bottom side of the midsole into the knit outsole to stretch the knit outsole in the location for the ground-engaging cleat member to permanently install the midsole and to form the ground-engaging cleat member.

14. A method for ordering a customized midsole and a customized cleat arrangement for an article of footwear comprising a knit outsole, the method comprising the steps of:
interacting with a cleat graphical interface system;
selecting a first pre-designed cleat arrangement from a group of pre-designed cleat arrangements, the first pre-designed cleat arrangement including a representation of a knit outsole having pre-defined cleat locations and a pre-defined number of cleats;
selecting a cleat graphics tool from a set of graphics tools associated with the cleat graphical interface system;
modifying the representation of the knit outsole displayed within the cleat graphical interface system using the selected cleat graphics tool to alter the first-designed cleat arrangement such that at least one of the pre-defined cleat locations or the pre-defined number of cleats is changed to create a customized cleat arrangement;
displaying the customized cleat arrangement including at least one changed pre-defined cleat location or changed pre-defined number of cleats within the cleat graphical interface system;
obtaining information relating to the user's foot;
interacting with a midsole graphical interface system;
selecting a first pre-designed midsole from a group of pre-designed midsoles, the first pre-designed midsole including a representation of a midsole having pre-defined locations for cleat reinforcing members in registration with cleats in the customized cleat arrangement;
selecting a midsole graphics tool from a set of graphics tools associated with the midsole graphical interface system;
modifying the representation of the midsole displayed within the midsole graphical interface system using the selected midsole graphics tool to alter the first-designed midsole such that at least one of the representation of the impression of the user's foot or the reinforcing members is changed to create a customized midsole arrangement;
displaying the customized midsole arrangement including at least one changed representation of the impression of the user's foot or reinforcing member within the midsole graphical interface system; and
submitting a finalized design including a modified knit outsole representation having the customized cleat arrangement including at least one changed pre-defined location or changed pre-defined number of cleats and a modified midsole representation having at least one changed representation of the impression of the user's foot or reinforcing member, and ordering the article of footwear.

15. The method according to claim 14, wherein the group of pre-designed cleat arrangements includes a plurality of types of cleat arrangements according to pre-determined cleat criteria.

16. The method according to claim 15, wherein the pre-determined cleat criteria is at least one of a degree of traction, a sport, and a medical condition.

17. The method according to claim 16, wherein the pre-determined cleat criterion is a sport; and
wherein the group of pre-designed cleat arrangements includes at least one of a cleat arrangement designed for football, a cleat arrangement designed for soccer, and a cleat arrangement designed for golf.

18. The method according to claim 17, wherein the pre-determined cleat criteria are a sport and a position; and
wherein the group of pre-designed cleat arrangements include at least one cleat arrangement associated with a first sport and a first position and at least one cleat arrangement associated with the first sport and a second position.

19. The method according to claim 16, wherein the pre-determined criterion is a medical condition; and
wherein the group of pre-designed cleat arrangements includes at least one cleat arrangement having cleat locations that do not correspond to a ball of a foot.

20. The method according to claim 15, wherein the group of pre-designed midsoles includes a plurality of types of midsoles according to pre-determined midsole criteria.

21. The method according to claim 14, wherein the pre-determined midsole criteria is at least one of a degree of comfort, a sport, and a medical condition.

22. The method according to claim 21, wherein the pre-determined midsole criterion is a sport; and wherein the group of pre-designed midsoles includes at least one of a midsole designed for football, a midsole designed for soccer, and a midsole designed for golf.

23. The method according to claim 21, wherein the pre-determined criterion is a medical condition; and wherein the group of pre-designed midsoles includes at least one midsole having features to accommodate the medical condition.

\* \* \* \* \*